(12) United States Patent
Li et al.

(10) Patent No.: US 10,455,294 B2
(45) Date of Patent: Oct. 22, 2019

(54) VIDEO DISTRIBUTION METHOD AND DEVICE

(71) Applicant: HUAWEI TECHNOLOGIES CO., LTD., Shenzhen (CN)

(72) Inventors: Zhiming Li, Reading (GB); Shuo Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 15/876,142

(22) Filed: Jan. 20, 2018

(65) Prior Publication Data

US 2018/0146260 A1 May 24, 2018

Related U.S. Application Data

(63) Continuation of application No. PCT/CN2015/084530, filed on Jul. 20, 2015.

(51) Int. Cl.
*H04N 21/6405* (2011.01)
*H04W 4/06* (2009.01)
(Continued)

(52) U.S. Cl.
CPC ....... *H04N 21/6405* (2013.01); *H04L 12/189* (2013.01); *H04N 21/2393* (2013.01);
(Continued)

(58) Field of Classification Search
None
See application file for complete search history.

(56) References Cited

U.S. PATENT DOCUMENTS

2011/0082924 A1 4/2011 Gopalakrishnan
2016/0135143 A1* 5/2016 Won ................ H04W 72/005
370/312
(Continued)

FOREIGN PATENT DOCUMENTS

CN 101136814 A 3/2008
CN 101848215 A 9/2010
(Continued)

OTHER PUBLICATIONS

3GPP TS 23.682 V13.2.0 (Jun. 2015);3rd Generation Partnership Project;Technical Specification Group Services and System Aspects;Architecture enhancements to facilitate communications with packet data networks and applications (Release 13),total 70 pages.
(Continued)

*Primary Examiner* — Michael R Telan
(74) *Attorney, Agent, or Firm* — Kilpatrick Townsend & Stockton LLP

(57) ABSTRACT

Embodiments of the present invention relate to the communications field, and provide a video distribution method and a device. The method includes: receiving, by an SCEF, a first request message sent by a third-party server, where the first request message includes an MBMS capability negotiation parameter for video distribution, the MBMS capability negotiation parameter being requested by the third-party server; sending, by the SCEF, a second request message to an HSS according to the first request message, to request the HSS to expose an MBMS capability; sending, by the SCEF, a third request message to a broadcast multicast service center BM-SC after the SCEF receives a second response message returned by the HSS when the HSS determines to allow the exposure of the MBMS capability, to request to obtain MBMS capability information exposed by the BM-
(Continued)

SC; and sending the MBMS capability information obtained from the BM-SC to the third-party server.

6 Claims, 13 Drawing Sheets

(51) Int. Cl.
    *H04N 21/2343*     (2011.01)
    *H04N 21/239*     (2011.01)
    *H04N 21/4402*     (2011.01)
    *H04W 8/04*     (2009.01)
    *H04L 12/18*     (2006.01)
    *H04L 29/06*     (2006.01)

(52) U.S. Cl.
    CPC ............ *H04N 21/234309* (2013.01); *H04N 21/440218* (2013.01); *H04W 4/06* (2013.01); *H04W 8/04* (2013.01); *H04L 65/80* (2013.01)

(56) References Cited

U.S. PATENT DOCUMENTS

2017/0164187 A1*   6/2017   Lu ........................... H04W 8/24
2018/0092133 A1*   3/2018   Starsinic ................ H04W 4/08

FOREIGN PATENT DOCUMENTS

| CN | 101909341 A | 12/2010 |
| CN | 103262561 A | 8/2013 |
| WO | 2008025708 A2 | 3/2008 |
| WO | 2015076713 A1 | 5/2015 |

OTHER PUBLICATIONS

3GPP TR 23.769 V13.0.0 (Jun. 2015);3rd Generation Partnership Project:Technical Specification Group Services and System Aspects;Group based Enhancements(Release 13),total 40 pages.

ZTE,"Group Message delivery method selection at the SCEF",SA WG2 Meeting #107 S2-150052,(Resubmission of S2-143999),Jan. 26-30, 2015, Sorrento, Italy,total 8 pages.

Huawei Technologies,"TMB2 Architecture consideratIon",3GPP TSG-SA4 Meeting #91 S4-161233,Bangalore, India, Oct. 24-28, 2016,total 4 pages.

"3GPP TR 23.789 V13.0.0 3rd Generation Partnership Project;Technical Specification Group Services and System Aspects;Monitoring enhancements (Release 13)", Technical Report, Mar. 2015, 33 pages.

* cited by examiner

VIDEO DISTRIBUTION METHOD AND DEVICE

CROSS-REFERENCE TO RELATED APPLICATIONS

This application is a continuation of International Application No. PCT/CN2015/084530, filed on Jul. 20, 2015, which is hereby incorporated by reference in the entirety.

TECHNICAL FIELD

The present application relates to the communications field, and in particular, to a video distribution method and a device.

BACKGROUND

OTT (Over The Top) means that an Internet company develops, by bypassing an operator, various open Internet-based video and data serving services, that is, only a network transmission capability of the operator is used, and a third party other than the operator provides an Internet television service or the like.

In an existing service and capability exposure (Service Exposure and Enablement Support, SEES) technology, an OTT third party (for example, Sohu video, LeTV, Baidu browser, or Tencent WeChat) may provide, by using a network transmission capability, a 3rd Generation Partnership Project (3GPP) network with a time period for requesting data, a volume of data sent in a specified region, quality of service (QoS), a priority, and the like. The 3GPP network sends, according to a request of the OTT third party, specified data according to QoS and a priority of network authorization in a specified region, and provides the OTT third party with a recommended time period, charging policy information, network anomaly information, status information of user equipment (UE), and the like.

If the operator supports an OTT video, none of multimedia broadcast multicast service (MBMS) supporting capabilities of the 3GPP network that include a media format support capability, a media distribution capability, a caching/transcoding capability, and an advertisement insertion capability are described in an existing 3GPP network capability exposure framework. In this way, the operator needs to perform interoperability testing with each OTT third party and develop and customize a video support capability for each OTT third party. For the OTT third party, because each operator has a different MBMS capability, if the OTT third party does not use an MBMS video support capability of the 3GPP network, the OTT third party still needs to perform interoperability testing with each operator, to adapt to different operator pipes and video supporting capabilities of different terminals. This increases IOT (interoperability testing) workload of the OTT third party, causing heavy video distribution and management load.

SUMMARY

Embodiments of the present invention provide a video distribution method and a device, so as to resolve problems of heavy workload and complex management when an operator exposes an MBMS media capability to an OTT third party, and problems of heavy IOT workload and heavy video distribution and management load when the OTT third party distributes videos by using a mobile network.

According to a first aspect, a video distribution method is provided, including:

receiving, by a service capability exposure function SCEF, a first request message sent by a third-party server, where the first request message includes a multimedia broadcast multicast service MBMS capability negotiation parameter for video distribution, the MBMS capability negotiation parameter being requested by the third-party server;

sending, by the SCEF, a second request message to a home subscriber server HSS according to the first request message, to request the HSS to expose an MBMS capability;

sending, by the SCEF, a third request message to a broadcast multicast service center BM-SC after the SCEF receives a second response message returned by the HSS when the HSS determines to allow the exposure of the MBMS capability, to request first MBMS capability information exposed by the BM-SC; and sending, by the SCEF, the first MBMS capability information obtained from the BM-SC to the third-party server, to enable the-third party server to request, according to the first MBMS capability information, to start an MBMS broadcast, and distributes video content to user equipment UE.

With reference to the first aspect, in a first possible implementation of the first aspect, the first request message further includes port information of the third-party server and media encoding information of the third-party server;

the second request message includes the MBMS capability negotiation parameter and/or an MBMS media capability exposure request indication, and the MBMS media capability exposure request indication is used to request the HSS to expose an MBMS pipe capability;

if the second request message includes the MBMS capability negotiation parameter, the second response message includes second MBMS capability information that is to be exposed and that is determined by the HSS according to subscription information between the HSS and an operator and the MBMS capability negotiation parameter; or if the second request message includes the MBMS media capability exposure request indication, the second response message includes an MBMS capability exposure request indication, and the MBMS capability exposure request indication is used to request the first MBMS capability information exposed and determined by the BM-SC;

the third request message includes the port information of the third-party server and the media encoding information of the third-party server; and if the second response message includes the second MBMS capability information, the third request message further includes the second MBMS capability information; or if the second response message does not include the second MBMS capability information, the third request message further includes the MBMS capability negotiation parameter.

With reference to the first possible implementation of the first aspect, in a second possible implementation of the first aspect, before the sending, by the SCEF, the first MBMS capability information obtained from the BM-SC to the third-party server, the method further includes:

receiving, by the SCEF, a third response message sent by the BM-SC, where the third response message includes the first MBMS capability information, a service portal link for transporting the video content, port information of the BM-SC, a charging rule, and media encoding information of the BM-SC.

With reference to the second possible implementation of the first aspect, in a third possible implementation of the first aspect, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported; and the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

According to a second aspect, a video distribution method is provided, including:

sending, by a third-party server, a first request message to a service capability exposure function SCEF, where the first request message includes a multimedia broadcast multicast service MBMS capability negotiation parameter for video distribution, the MBMS capability negotiation parameter being requested by the third-party server;

receiving, by the third-party server, a first response message sent by the SCEF, where the first response message includes exposed MBMS capability information obtained by the SCEF and a service portal link that is used for transporting video content and that is obtained from a broadcast multicast service center BM-SC; and sending, by the third-party server to the UE, the service portal link for transporting the video content, and requesting, according to the MBMS capability information, to start an MBMS broadcast to distribute the video content to the UE.

With reference to the second aspect, in a first possible implementation of the second aspect, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported;

the first request message further includes port information of the third-party server and media encoding information of the third-party server; and the first response message further includes port information of the BM-SC, media encoding information of the BM-SC, and a charging rule that are obtained by the SCEF; where the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

With reference to the second aspect or the first possible implementation of the second aspect, in a second possible implementation of the second aspect, before the sending, by a third-party server, a first request message to an SCEF, or after the receiving, by the third-party server, a first response message sent by the SCEF, the method further includes:

receiving, by the third-party server, Hypertext Transfer Protocol HTTP request messages sent by at least two UEs, where the HTTP request message is used to request same video content.

With reference to the second aspect or the first possible implementation or the second possible implementation of the second aspect, in a third possible implementation of the second aspect, after the sending, by the third-party server to user equipment UE, the service portal link for transporting the video content, the method further includes:

sending, by the third-party server, the video content to the BM-SC or the SCEF.

According to a third aspect, a video distribution method is provided, including:

receiving, by a broadcast multicast service center BM-SC, a first request message sent by a service capability exposure function SCEF, where the first request message is used to obtain multimedia broadcast multicast service MBMS capability information during video content distribution; and sending, by the BM-SC, a first response message to the SCEF, where the first response message includes first MBMS capability information exposed by the BM-SC, so as to distribute video content to user equipment UE after the SCEF starts an MBMS broadcast according to the first MBMS capability information.

With reference to the third aspect, in a first possible implementation of the third aspect, the first request message includes an MBMS capability negotiation parameter for video distribution and that is requested by a third-party server, or the first request message includes second MBMS capability information that is to be exposed and that is determined by a home subscriber server HSS according to the MBMS capability negotiation parameter obtained from the third-party server; and before the sending, by the BM-SC, a first response message to the SCEF, the method further includes:

determining, by the BM-SC according to the MBMS capability negotiation parameter and subscription information between the BM-SC and an operator, the first MBMS capability information exposed by the BM-SC; or determining, by the BM-SC according to the second MBMS capability information that is to be exposed and that is determined by the HSS and subscription information between the BM-SC and the operator, the first MBMS capability information exposed by the BM-SC.

With reference to the third aspect or the first possible implementation of the third aspect, in a second possible implementation of the third aspect, the first request message further includes port information of the third-party server and media encoding information of the third-party server; and the first response message includes port information of the BM-SC, a service portal link for transporting the video content, a charging rule, and media encoding information of the BM-SC; and the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

With reference to the second possible implementation of the third aspect, in a third possible implementation of the third aspect, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

With reference to the second possible implementation or the third possible implementation of the third aspect, in a fourth possible implementation of the third aspect, after the sending, by the BM-SC, a first response message to the SCEF, the method further includes:

sending, by the BM-SC to the UE, the service portal link for transporting the video content; and receiving, by the BM-SC according to the port information of the BM-SC, video content sent by the third-party server, and sending the video content to the UE.

According to a fourth aspect, a video distribution method is provided, including:

receiving, by a home subscriber server HSS, a first request message sent by a service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability; and determining, by the HSS according to subscription information between the HSS and an operator, and the MBMS capability negotiation parameter and/or the MBMS media capability exposure request, whether to allow the exposure of the MBMS capability.

With reference to the fourth aspect, in a first possible implementation of the fourth aspect, if the first request message includes the MBMS capability negotiation parameter, when the HSS determines to allow the exposure of the MBMS capability, the method further includes:

determining, by the HSS, exposed MBMS capability information according to the subscription information and the MBMS capability negotiation parameter; and sending, by the HSS, a first response message to the SCEF, where the first response message includes the MBMS capability information, where if the first request message includes the MBMS media capability exposure request indication, and the HSS determines to allow the exposure of the MBMS capability, the first response message includes an MBMS capability exposure request indication, to notify the SCEF that the exposure of the MBMS capability is allowed.

With reference to the first possible implementation of the fourth aspect, in a second possible implementation, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

According to a fifth aspect, a service capability exposure function SCEF is provided, including:

a receiving unit, configured to receive a first request message sent by a third-party server, where the first request message includes a multimedia broadcast multicast service MBMS capability negotiation parameter for video distribution, the MBMS capability negotiation parameter being requested by the third-party server; and a sending unit, configured to send a second request message to a home subscriber server HSS according to the first request message, to request the HSS to expose an MBMS capability, where the sending unit is further configured to send a third request message to a broadcast multicast service center BM-SC when the receiving unit receives a second response message returned by the HSS when the HSS determines to allow the exposure of the MBMS capability, to request first MBMS capability information exposed by the BM-SC; and the sending unit is further configured to send the first MBMS capability information obtained from the BM-SC to the third-party server, to enable the-third party server to request, according to the first MBMS capability information, to start an MBMS broadcast, and distributes video content to user equipment UE.

With reference to the fifth aspect, in a first possible implementation of the fifth aspect, the first request message further includes port information of the third-party server and media encoding information of the third-party server;

the second request message includes the MBMS capability negotiation parameter and/or an MBMS media capability exposure request indication, and the MBMS media capability exposure request indication is used to request the HSS to expose an MBMS pipe capability;

if the second request message includes the MBMS capability negotiation parameter, the second response message includes second MBMS capability information that is to be exposed and that is determined by the HSS according to subscription information between the HSS and an operator and the MBMS capability negotiation parameter; or if the second request message includes the MBMS media capability exposure request indication, the second response message includes an MBMS capability exposure request indication, and the MBMS capability exposure request indication is used to request the first MBMS capability information exposed and determined by the BM-SC;

the third request message includes the port information of the third-party server and the media encoding information of the third-party server; and if the second response message includes the second MBMS capability information, the third request message further includes the second MBMS capability information; or if the second response message does not include the second MBMS capability information, the third request message further includes the MBMS capability negotiation parameter.

With reference to the first possible implementation of the fifth aspect, in a second possible implementation of the fifth aspect, the receiving unit is further configured to:

receive a third response message sent by the BM-SC, where the third response message includes the first MBMS capability information, a service portal link for transporting the video content, port information of the BM-SC, a charging rule, and media encoding information of the BM-SC.

With reference to the first possible implementation of the fifth aspect, in a second possible implementation of the fifth aspect, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported; and the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

According to a sixth aspect, a third-party server is provided, including:

a sending unit, configured to send a first request message to a service capability exposure function SCEF, where the first request message includes a multimedia broadcast multicast service MBMS capability negotiation parameter for video distribution, the MBMS capability negotiation parameter being requested by the third-party server;

a receiving unit, configured to receive a first response message sent by the SCEF, where the first response message includes exposed MBMS capability information obtained by the SCEF and a service portal link that is used for transporting video content and that is obtained from a broadcast multicast service center BM-SC, where the sending unit is further configured to send, to the UE, the service portal link for transporting the video content; and a processing unit, configured to request, according to the MBMS capability information, to start an MBMS broadcast to distribute the video content to the UE.

With reference to the sixth aspect, in a first possible implementation of the sixth aspect, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported;

the first request message further includes port information of the third-party server and media encoding information of the third-party server; and the first response message further includes port information of the BM-SC, media encoding information of the BM-SC, and a charging rule that are obtained by the SCEF; where the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

With reference to the sixth aspect or the first possible implementation of the sixth aspect, in a second possible implementation of the sixth aspect, the receiving unit is further configured to: before the third-party server sends the first request message to the SCEF, or after the third-party server receives the first response message sent by the SCEF, receive Hypertext Transfer Protocol HTTP request messages sent by at least two UEs, where the HTTP request message is used to request same video content.

With reference to the sixth aspect or the first possible implementation or the second possible implementation of the sixth aspect, in a third possible implementation of the sixth aspect, the sending unit is further configured to:

after sending, to the user equipment UE, the service portal link for transporting the video content, send the video content to the BM-SC or the SCEF.

According to a seventh aspect, a broadcast multicast service center BM-SC is provided, including:

a receiving unit, configured to receive a first request message sent by a service capability exposure function SCEF, where the first request message is used to obtain multimedia broadcast multicast service MBMS capability information during video content distribution; and a sending unit, configured to send a first response message to the SCEF, where the first response message includes first MBMS capability information exposed by the BM-SC, so as to distribute video content to user equipment UE after the SCEF starts an MBMS broadcast according to the first MBMS capability information.

With reference to the seventh aspect, in a first possible implementation of the seventh aspect, the first request message includes an MBMS capability negotiation parameter for video distribution and that is requested by a third-party server, or the first request message includes second MBMS capability information that is to be exposed and that is determined by a home subscriber server HSS according to the MBMS capability negotiation parameter obtained from the third-party server; and the BM-SC further includes: a processing unit, configured to determine, according to the MBMS capability negotiation parameter and subscription information between the BM-SC and an operator, the first MBMS capability information exposed by the BM-SC; or the processing unit is configured to determine, according to the second MBMS capability information that is to be exposed and that is determined by the HSS and subscription information between the BM-SC and the operator, the first MBMS capability information exposed by the BM-SC.

With reference to the seventh aspect or the first possible implementation of the seventh aspect, in a second possible implementation of the seventh aspect, the first request message further includes port information of the third-party server and media encoding information of the third-party server; and the first response message includes port information of the BM-SC, a service portal link for transporting the video content, a charging rule, and media encoding information of the BM-SC; and the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

With reference to the second possible implementation of the seventh aspect, in a third possible implementation of the seventh aspect, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

With reference to the second possible implementation or the third possible implementation of the seventh aspect, in a fourth possible implementation of the seventh aspect, the sending unit is further configured to: send, to the UE, the service portal link for transporting the video content;

the receiving unit is further configured to receive, according to the port information of the BM-SC, video content sent by the third-party server; and the sending unit is further configured to send the video content to the UE.

According to an eighth aspect, a home subscriber server HSS is provided, including:

a receiving unit, configured to receive a first request message sent by a service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability; and a processing unit, configured to determine, according to subscription information between the HSS and an operator, and the MBMS capability negotiation parameter and/or the MBMS media capability exposure request, whether to allow the exposure of the MBMS capability.

With reference to the eighth aspect, in a first possible implementation of the eighth aspect, if the first request message includes the MBMS capability negotiation parameter, the processing unit is further configured to determine exposed MBMS capability information according to the subscription information and the MBMS capability negotiation parameter; and the HSS further includes a sending unit, configured to send a first response message to the SCEF, where the first response message includes the MBMS capability information, where if the first request message includes the MBMS media capability exposure request indication, and the HSS determines to allow the exposure of the MBMS capability, the first response message includes an MBMS capability exposure request indication, to notify the SCEF that the exposure of the MBMS capability is allowed.

With reference to the first possible implementation of the eighth aspect, in a second possible implementation of the eighth aspect, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

According to a ninth aspect, a service capability exposure function SCEF is provided, including: a receiver, configured to receive a first request message sent by a third-party server, where the first request message includes a multimedia broadcast multicast service MBMS capability negotiation parameter for video distribution, the MBMS capability negotiation parameter being requested by the third-party server; and a transmitter, configured to send a second request message to a home subscriber server HSS according to the first request message, to request the HSS to expose an MBMS capability, where the transmitter is further configured to send a third request message to a broadcast multicast service center BM-SC when the receiver receives a second response message returned by the HSS when the HSS determines to allow the exposure of the MBMS capability, to request first MBMS capability information exposed by the BM-SC; and the transmitter is further configured to send the first MBMS capability information obtained from the BM-SC to the third-party server, to enable the-third party server to request, according to the first MBMS capability information, to start an MBMS broadcast, and distributes video content to user equipment UE.

With reference to the ninth aspect, in a first possible implementation of the ninth aspect, the first request message further includes port information of the third-party server and media encoding information of the third-party server;

the second request message includes the MBMS capability negotiation parameter and/or an MBMS media capability exposure request indication, and the MBMS media capability exposure request indication is used to request the HSS to expose an MBMS pipe capability;

if the second request message includes the MBMS capability negotiation parameter, the second response message includes second MBMS capability information that is to be exposed and that is determined by the HSS according to subscription information between the HSS and an operator and the MBMS capability negotiation parameter; or if the second request message includes the MBMS media capability exposure request indication, the second response message includes an MBMS capability exposure request indication, and the MBMS capability exposure request indication is used to request the first MBMS capability information exposed and determined by the BM-SC;

the third request message includes the port information of the third-party server and the media encoding information of the third-party server; and if the second response message includes the second MBMS capability information, the third request message further includes the second MBMS capability information; or if the second response message does not include the second MBMS capability information, the third request message further includes the MBMS capability negotiation parameter.

With reference to the first possible implementation of the ninth aspect, in a second possible implementation of the ninth aspect, the receiver is further configured to receive a third response message sent by the BM-SC, where the third response message includes the first MBMS capability information, a service portal link for transporting the video content, port information of the BM-SC, a charging rule, and media encoding information of the BM-SC.

With reference to the second possible implementation of the ninth aspect, in a third possible implementation of the ninth aspect, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported; and the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

According to a tenth aspect, a third-party server is provided, including:

a transmitter, configured to send a first request message to a service capability exposure function SCEF, where the first request message includes a multimedia broadcast multicast service MBMS capability negotiation parameter for video distribution, the MBMS capability negotiation parameter being requested by the third-party server;

a receiver, configured to receive a first response message sent by the SCEF, where the first response message includes exposed MBMS capability information obtained by the SCEF and a service portal link that is used for transporting video content and that is obtained from a broadcast multicast service center BM-SC, where the transmitter is further configured to send, to the UE, the service portal link for transporting the video content; and a processor, configured to request, according to the MBMS capability information, to start an MBMS broadcast to distribute the video content to the UE.

With reference to the tenth aspect, in a first possible implementation of the tenth aspect, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported;

the first request message further includes port information of the third-party server and media encoding information of the third-party server; and the first response message further includes port information of the BM-SC, media encoding information of the BM-SC, and a charging rule that are obtained by the SCEF; where the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

With reference to the tenth aspect or the first possible implementation of the tenth aspect, in a second possible implementation of the tenth aspect, the receiver is further configured to: before the transmitter sends the first request message to the SCEF, or after the receiver receives the first response message sent by the SCEF, receive Hypertext Transfer Protocol HTTP request messages sent by at least two UEs, where the HTTP request message is used to request same video content.

With reference to the tenth aspect or the first possible implementation or the second possible implementation of the tenth aspect, in a third possible implementation of the tenth aspect, the transmitter is further configured to: after sending, to the user equipment UE, the service portal link for transporting the video content, send the video content to the BM-SC or the SCEF.

According to an eleventh aspect, a broadcast multicast service center BM-SC is provided, including:

a receiver, configured to receive a first request message sent by a service capability exposure function SCEF, where the first request message is used to obtain multimedia broadcast multicast service MBMS capability information during video content distribution; and a transmitter, configured to send a first response message to the SCEF, where the first response message includes first MBMS capability information exposed by the BM-SC, so as to distribute video content to user equipment UE after the SCEF starts an MBMS broadcast according to the first MBMS capability information.

With reference to the eleventh aspect, in a first possible implementation of the eleventh aspect, the first request message includes an MBMS capability negotiation parameter for video distribution and that is requested by a third-party server, or the first request message includes second MBMS capability information that is to be exposed and that is determined by a home subscriber server HSS according to the MBMS capability negotiation parameter obtained from the third-party server; and the BM-SC further includes: a processor, configured to: determine, according to the MBMS capability negotiation parameter and subscription information between the BM-SC and an operator, the first MBMS capability information exposed by the BM-SC; or determine, according to the second MBMS capability information that is to be exposed and that is determined by the HSS and subscription information between the BM-SC and the operator, the first MBMS capability information exposed by the BM-SC.

With reference to the eleventh aspect or the first possible implementation of the eleventh aspect, in a second possible implementation of the eleventh aspect, the first request message further includes port information of the third-party server and media encoding information of the third-party server; and the first response message includes port information of the BM-SC, a service portal link for transporting the video content, a charging rule, and media encoding information of the BM-SC; and the port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

With reference to the second possible implementation of the eleventh aspect, in a third possible implementation of the eleventh aspect, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

With reference to the second possible implementation or the third possible implementation of the eleventh aspect, in a fourth possible implementation of the eleventh aspect, the transmitter is further configured to send, to the UE, the service portal link for transporting the video content; and the receiver is further configured to receive, according to the port information of the BM-SC, video content sent by the third-party server; and the transmitter is further configured to send the video content to the UE.

According to a twelfth aspect, a home subscriber server HSS is provided, including:

a receiver, configured to receive a first request message sent by a service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability; and a processor, configured to determine, according to subscription information between the HSS and an operator, and the MBMS capability negotiation parameter and/or the MBMS media capability exposure request, whether to allow the exposure of the MBMS capability.

With reference to the twelfth aspect, in a first possible implementation of the twelfth aspect, if the first request message includes the MBMS capability negotiation parameter, when the processor is configured to determine to allow the exposure of the MBMS capability, the processor is further configured to determine exposed MBMS capability information according to the subscription information and the MBMS capability negotiation parameter; and the transmitter is further configured to send a first response message to the SCEF, where the first response message includes the MBMS capability information, where if the first request message includes the MBMS media capability exposure request indication, and the HSS determines to allow the exposure of the MBMS capability, the first response message includes an MBMS capability exposure request indication, to notify the SCEF that the exposure of the MBMS capability is allowed.

With reference to the first possible implementation of the twelfth aspect, in a second possible implementation of the twelfth aspect, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

The embodiments of the present invention provide a video distribution method and a device. The SCEF receives a first request message sent by the third-party server, where the first request message includes a multimedia broadcast multicast service MBMS capability negotiation parameter for video distribution, the MBMS capability negotiation parameter being requested by the third-party server, and sends a second request message to the home subscriber server HSS according to the first request message, to request the HSS to expose an MBMS capability. The SCEF sends a third request message to the broadcast multicast service center BM-SC after the SCEF receives a second response message returned by the HSS when the HSS determines to allow the exposure of the MBMS capability, to request first MBMS capability information exposed by the BM-SC. The SCEF sends the exposed first MBMS capability information obtained from the BM-SC to the third-party server, so that the third-party server starts an MBMS broadcast according to the exposed first MBMS capability information and distributes video content to the user equipment UE. That is, when multiple UEs access the video content, the third-party server providing the video content may interact with an SCEF of a 3GPP network and the BM-SC, and negotiates with the BM-SC to determine a to-be-exposed MBMS capability according to the MBMS capability negotiation parameter. The third-party server redirects requests of the UEs to a broadcast reception mode of the 3GPP, to receive the video content, so as to expand the MBMS capability to OTT video supporting. In this way, an OTT third party does not need to perform negotiation and testing with different operators or different terminals, and technical difficulty of the OTT third party in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present application.

The embodiments of the present invention may be applied to a multimedia broadcast multicast service MBMS architecture of an evolved packet system (EPS). The MBMS is a point-to-multipoint service, can implement data transmission from a single entity to multiple receivers, and may include the following network elements and devices:

UE supports an activation/deactivation function of an MBMS bearer service.

A packet data network gateway (P-GW) is a user plane anchor between a 3GPP access network and a non-3GPP access network, and an interface with an external packet data network.

A broadcast multicast service center (BM-SC) is used for charging record generation, member management, MBMS session and transmission management, service notification management, MBMS transmission security support, MBMS session transmission and retransmission schedule determining, identification of each MBMS session, temporary mobile group identity (TMGI) allocation, MBMS bearer resource initiation or termination, and MBMS data sending, and has an error resilience policy, or the like.

In a capability exposure architecture, a service capability exposure function (SCEF) is located between a 3GPP network and a service capability server (SCS)/third-party server (Application Server, AS), and the SCS/AS may initiates a service capability request to the SCEF by using an application programming interface (API) or the SCS/AS directly initiates a request to a network entity. The SCEF requests a corresponding network capability from the 3GPP network, and then the SCEF sends the obtained network capability/a result to the SCS/AS by using the API. For broadcast capability exposure, the SCEF is connected to the BM-SC by using an interface, the AS requests allocation/release of a TMGI also by using the interface, to activate/deactivate/modify an MBMS bearer, and the BM-SC notifies MBMS status information to the AS by using the interface.

Figure 1:
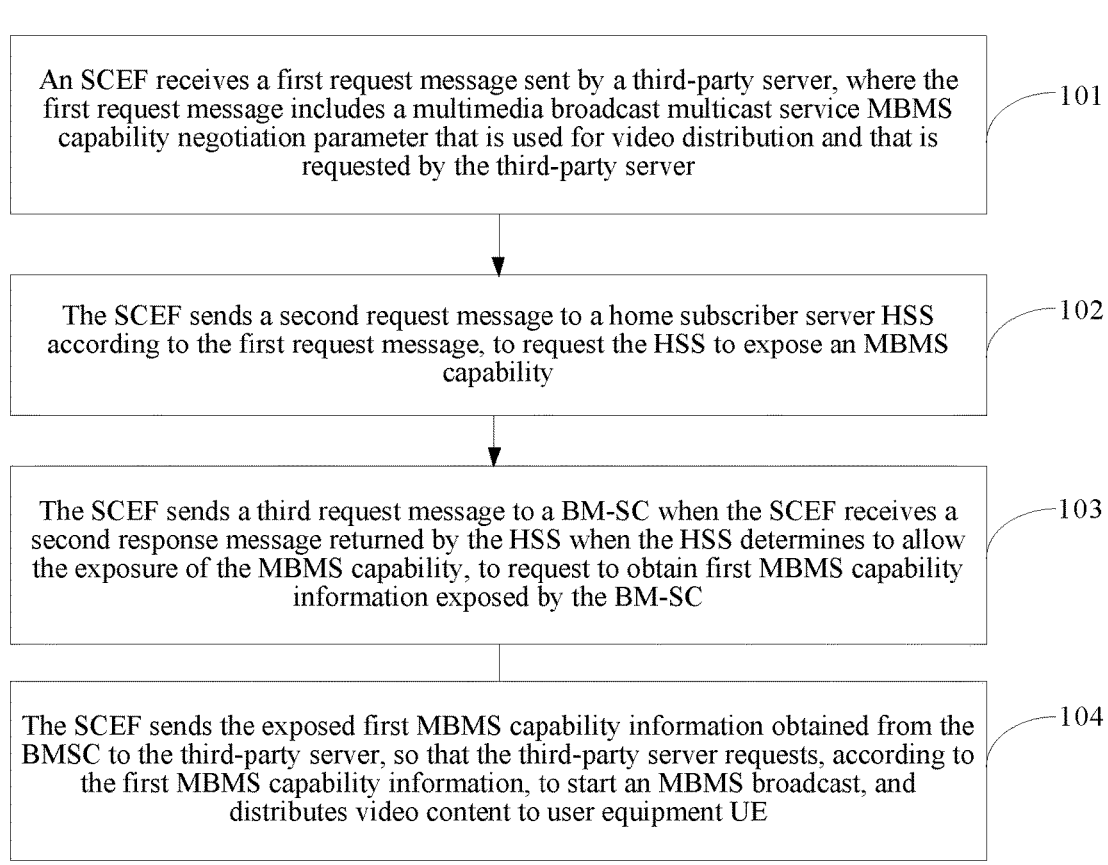
FIG. 1 is a schematic flowchart of a video distribution method according to an embodiment of the present invention.

Based on the foregoing MBMS architecture and capability exposure architecture, an embodiment of the present invention provides a video distribution method. As shown in FIG. 1, the method includes the following steps.

101. An SCEF receives a first request message sent by a third-party server, where the first request message includes a multimedia broadcast multicast service MBMS capability negotiation parameter for video distribution, the MBMS capability negotiation parameter being requested by the third-party server.

For an operator, the third-party server may be referred to the foregoing SCS/AS. For a user, the third-party server may be referred to as an OTT video server, providing video content to the user.

Before the SCEF receives the first request message sent by the third-party server, UE may first access the OTT video server. After detecting that at least two UEs access same video content, the OTT video server interacts with an SCEF of a 3GPP, and sends, to the SCEF, the first request message to request for invoking an MBMS video support capability of a 3GPP network. The first request message includes an MBMS capability negotiation parameter for video distribution and that is requested by the OTT video server, for example, a transport mode indication of the video content, a security feature indication of an MBMS, an indication showing that content caching is supported, or an indication showing that content caching is not supported.

Alternatively, the OTT video server may request in advance an MBMS capability exposure resource from a 3GPP network, to send the first request message to the SCEF. In this way, when detecting that at least two UEs access same video content, the OTT video server may redirect requests of the UEs to a broadcast reception mode, to receive the video content.

Alternatively, policy information is preconfigured in the third-party server, and when receiving an HTTP request sent by the UE, the third-party server sends the first request message to the SCEF. This is not limited in the present disclosure.

The first request message may further include port information of the third-party server and media encoding information of the third-party server. The port information of the third-party server is used for trusted channel data transmission between the third-party server and a BM-SC. The media encoding information includes at least one of video encoding information, audio encoding information, text encoding information, or picture encoding information.

102. The SCEF sends a second request message to a home subscriber server HSS according to the first request message, to request the HSS to expose an MBMS capability.

The SCEF adds the MBMS capability negotiation parameter and/or an MBMS media capability exposure request indication in the first request message to a second request message, and sends the second request message to a home subscriber server (HSS). The MBMS media capability exposure request indication is used to request the HSS to expose an MBMS pipe capability. Therefore, the HSS may check subscription information between the HSS and an operator, to determine whether the MBMS capability is allowed to be exposed to an OTT third party. If the HSS performs MBMS capability determining, the HSS determines, for example, whether to expose the MBMS pipe capability, whether to expose a media capability (including a content caching capability, a media transcoding capability, or the like), or whether to expose an advertisement insertion capability.

103. The SCEF sends a third request message to a BM-SC after the SCEF receives a second response message returned by the HSS when the HSS determines to allow the exposure of the MBMS capability, to request first MBMS capability information exposed by the BM-SC.

When determining to expose the MBMS capability, the HSS returns the second response message to the SCEF, to represent that the MBMS capability is allowed to be exposed to the OTT third party. If the second request message includes the MBMS capability negotiation parameter, when the HSS allows the exposure of the MBMS capability, the second response message includes second MBMS capability information that is to be exposed and that is determined by the HSS according to subscription information between the HSS and an operator and the MBMS capability negotiation parameter. If the second response message includes the second MBMS capability information, the third request message further includes the second MBMS capability information, that is, the BM-SC determines the first MBMS capability information according to the second MBMS capability information determined by the HSS and the subscription information between the BM-SC and the operator.

If the second request message includes the MBMS media capability exposure request indication, the second response message includes an MBMS capability exposure request indication, and the MBMS capability exposure request indication is used to request the first MBMS capability information exposed and determined by the BM-SC. In this case, if the second request message further includes the MBMS capability negotiation parameter, the first MBMS capability information in the second response message is determined by the BM-SC according to the second MBMS capability information determined by the HSS. If the second response message does not include the second MBMS capability information, the third request message further includes the MBMS capability negotiation parameter, that is, the HSS does not perform MBMS capability determining, but the BM-SC directly determines to-be-exposed first MBMS capability information according to the MBMS capability negotiation parameter and the subscription information between the BM-SC and the operator only when the HSS determines to allow the exposure of the MBMS capability.

The MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

104. The SCEF sends the exposed first MBMS capability information obtained from the BM-SC to the third-party server, to enable the-third party server to request, according to the first MBMS capability information, to start an MBMS broadcast, and distributes video content to user equipment UE.

Before the sending, by the SCEF, the first MBMS capability information obtained from the BM-SC to the third-party server, the method further includes: receiving, by the SCEF, a third response message sent by the BM-SC, where the third response message includes the first MBMS capability information, a service portal link for transporting the video content, port information of the BM-SC, a charging rule, and media encoding information of the BM-SC.

The service portal link for transporting the video content may be a user service description (USD) uniform resource locator (URL) provided by the BM-SC, or a domain name address of the BM-SC, or the like. The port information of the BM-SC is used for trusted channel data transmission between the BM-SC and the third-party server.

The SCEF then sends the first MBMS capability information obtained from the BM-SC, the service portal link for transporting the video content, the port information of the BM-SC, the charging rule, and the media encoding information of the BM-SC to the third-party server. In this way, the third-party server requests the 3GPP network to start an MBMS broadcast, and notifies the video content to the UE according to the MBMS capability information exposed by the BM-SC, that is, redirects a request of the UE to an MBMS broadcast reception mode, to receive the video content, so as to expand the MBMS capability to OTT video supporting. In this way, technical difficulty of the OTT third party in providing a video service is reduced, the OTT third party does not need to perform negotiation and testing with different operators or different terminal types separately, and workload of the OTT third party is reduced.

This embodiment of the present invention provides a video distribution method. The SCEF receives a first request message sent by the third-party server, where the first request message includes a multimedia broadcast multicast service MBMS capability negotiation parameter for video distribution, the MBMS capability negotiation parameter being requested by the third-party server, and sends a second request message to the home subscriber server HSS according to the first request message, to request the HSS to expose an MBMS capability. The SCEF sends a third request message to the broadcast multicast service center BM-SC after the SCEF receives a second response message returned by the HSS when the HSS determines to allow the exposure of the MBMS capability, to request first MBMS capability information exposed by the BM-SC. The SCEF sends the exposed first MBMS capability information obtained from the BM-SC to the third-party server, so that the third-party server starts an MBMS broadcast according to the exposed first MBMS capability information and distributes video content to the user equipment UE. That is, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter. The third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Based on the foregoing embodiment, the following specifically describes an embodiment of the present invention.

Figure 2A:
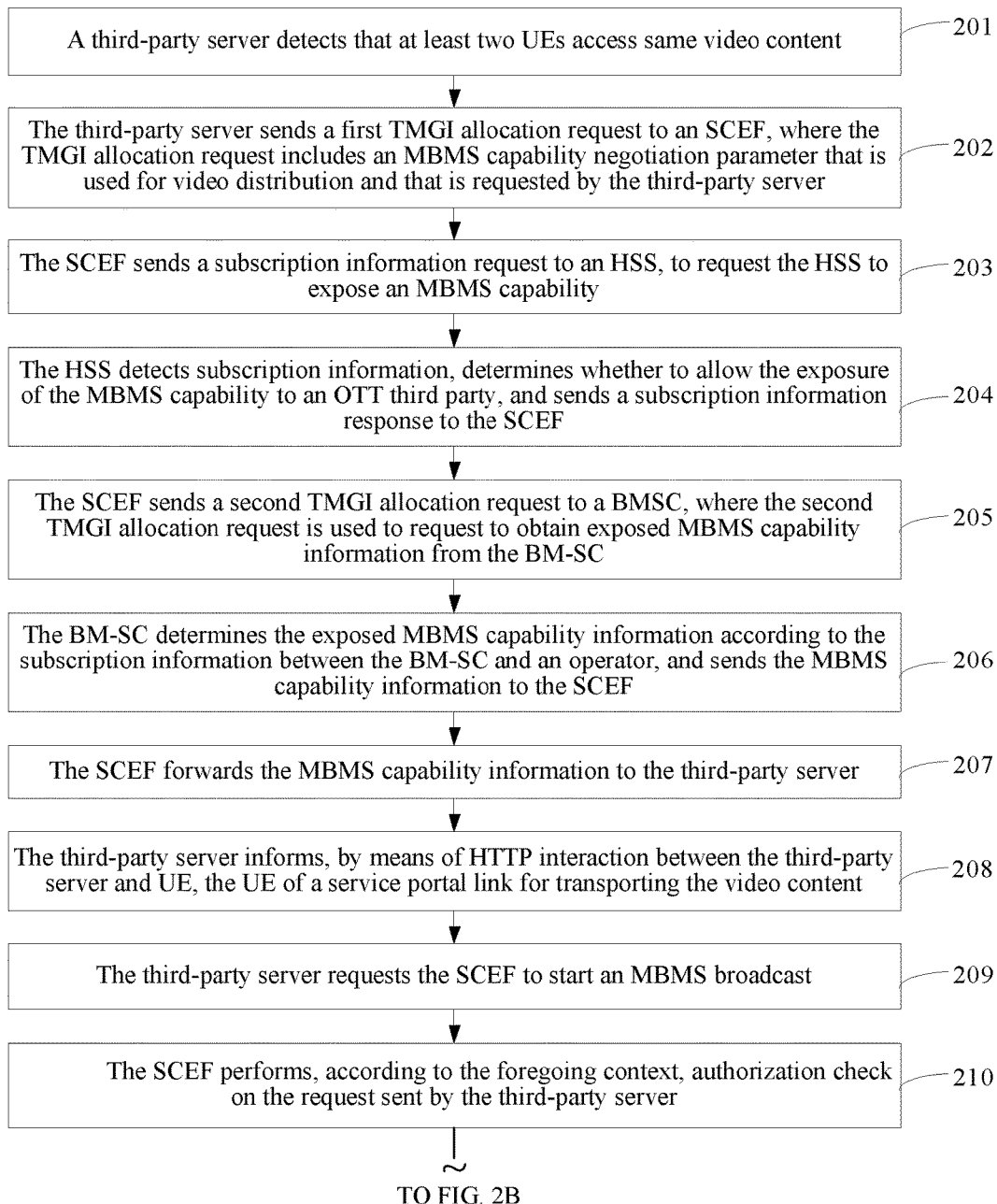
FIG. 2A and FIG. 2B are a schematic flowchart of a video distribution method according to an embodiment of the present invention.
Figure 2B:
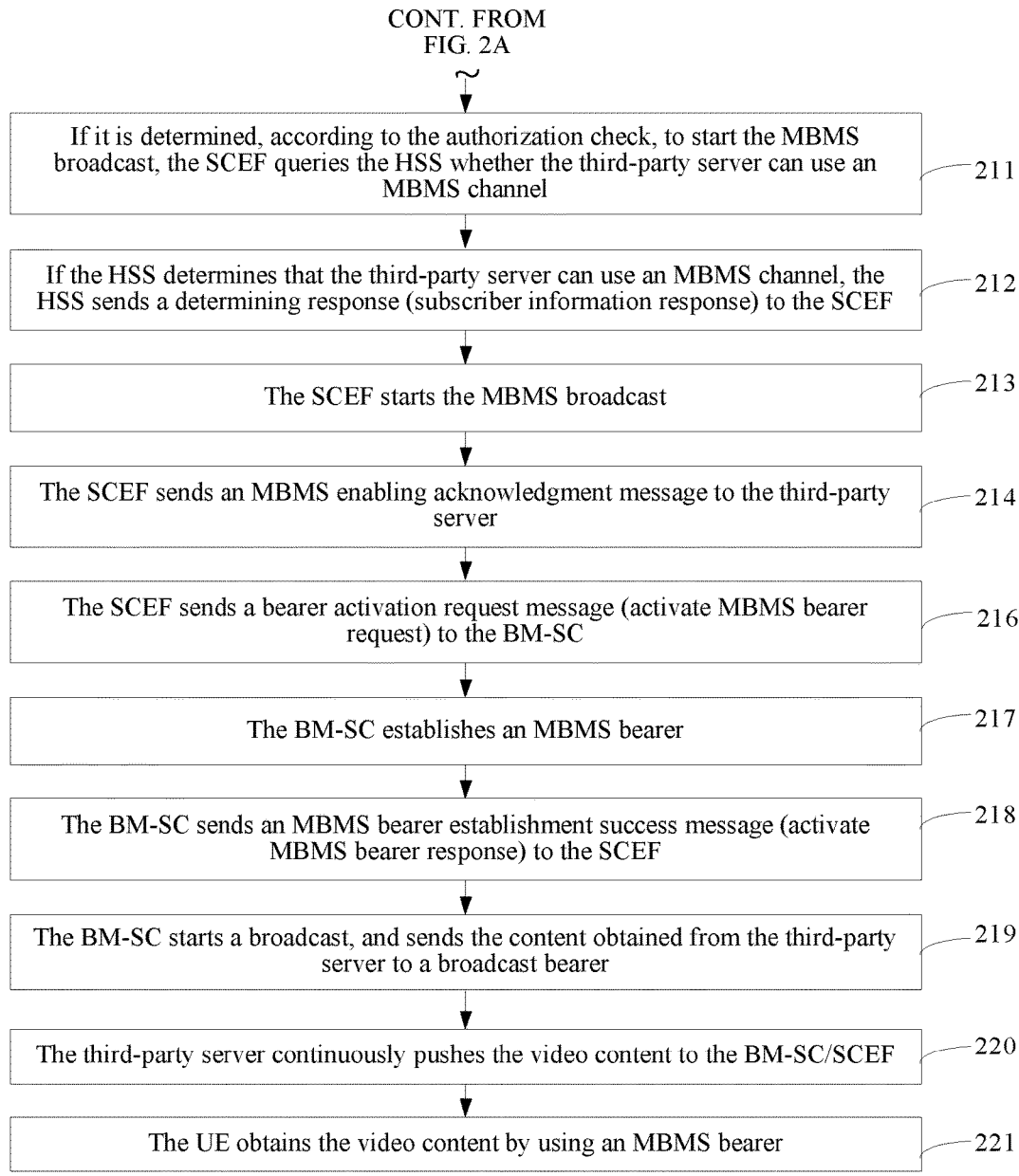

For a scenario in which an OTT video server requests, after detecting that at least two UEs access same video content, a 3GPP network to expose an MBMS capability, another embodiment of the present invention provides a video distribution method. As shown in FIG. 2, the method includes the following steps.

201. A third-party server detects that at least two UEs access same video content.

For example, UE 1 sends an HTTP request message to the third-party server, to request to send video content. The HTTP request message includes a URL corresponding to the video content. UE 2 also sends an HTTP request message to the third-party server, and also requests, from the third-party server, the video content corresponding to the same URL. Therefore, the third-party server detects, according to the URL, that multiple UEs access the same video content. Then the third-party server determines to invoke a video capability of a 3GPP network to distribute the video content.

202. The third-party server sends a first TMGI allocation request to an SCEF, where the TMGI allocation request includes an MBMS capability negotiation parameter for video distribution, the MBMS capability negotiation parameter being requested by the third-party server.

The MBMS capability negotiation parameter for video distribution is added to an existing TMGI allocation request (Allocate TMGI Request) by using a standard open interface and by using the TMGI allocation request. That is, the first TMGI allocation request herein is equivalent to the first request message in the foregoing embodiment. The first TMGI allocation request includes the MBMS capability negotiation parameter for video distribution, the MBMS capability negotiation parameter being requested by the third-party server. The MBMS capability negotiation parameter may include: a transport mode indication of the video content. The transport mode indication may include a broadcast mode (Broad Cast only), or a broadcast/unicast hybrid mode (hybrid Broad Cast/Unitary Cast, hybrid BC/UC), or a dynamic broadcast/unicast mode (dynamic BC/UC), that is, a mode dynamically switching between a broadcast mode and a unicast mode; may further include a security feature indication for using the MBMS (MBMS security feature allowed), where the security feature indication is an enabled state or a disabled state; may further include a content transcoding capability support indication (content transcoding capability support), which includes an indication showing that transcoding is supported or an indication showing that transcoding is not supported; may further include a content caching indication (caching support), which includes an indication showing that content caching is supported or an indication showing that content caching is not supported; may further include an advertisement insertion capability indication, where the advertisement insertion capability indication is an indication showing that insertion of an advertisement is supported or an indication showing that insertion of an advertisement is not supported; may further include quality of experience (QoE) reporting indication, where the QoE reporting indication is an indication showing that QoE is to be reported or an indication showing that QoE is not to be reported; may further include a network information reporting indication, where the network information reporting indication is an indication showing that network information is to be reported or an indication showing that network information is not to be reported, and the network information includes at least one of a UE identifier, a serving cell identifier, or a network congestion state; or may further include an advertisement purchasing information indication, where the advertisement insertion capability indication is an indication showing that insertion of an advertisement is supported or an indication showing that insertion of an advertisement is not supported.

The first TMGI allocation request may further include port information (SCS port information) of the third-party server, for example, an IP address and a port number of an SCS, used for trusted channel data transmission between the third-party server and the BM-SC; may further include media encoding information (media layer information) of the third party server, including, for example, video encoding information, such as video H.264/H.265; and audio encoding information, such as adaptive multi-rate wideband coding (AMR-WB), adaptive multi-rate narrowband coding (AMR-NB), or an enhanced voice service (EVS); or may further include other media information, for example, text encoding information, or picture encoding information.

Certainly, the first TMGI allocation request further includes a group identifier (external group ID), an SCS ID, UE IDs, and the like of video content already existing in the request.

203. The SCEF sends a subscription information request to an HSS, to request the HSS to expose an MBMS capability.

When receiving the first TMGI allocation request, the SCEF sends, to the HSS, a subscription information request, which is equivalent to the second request message in the foregoing embodiment. The subscription information request may carry the MBMS capability negotiation parameter and/or an MBMS media capability exposure request indication. The MBMS media capability exposure request indication is used to request the HSS to expose an MBMS pipe capability, or may further include an external group ID, an SCS ID, and the like, so as to request the HSS to expose the MBMS capability to an OTT third party, for example, Sohu video, or LeTV.

204. The HSS detects subscription information, determines whether to allow the exposure of the MBMS capability to an OTT third party, and sends a subscription information response to the SCEF.

According to the description of step 203, the subscription information request may include the MBMS capability negotiation parameter, or the MBMS media capability exposure request indication, or the MBMS capability negotiation parameter and the MBMS media capability exposure request indication; or the subscription information request indicates that no parameter or indication is added.

When the subscription information request indicates that no parameter or indication is added, if the HSS receives the subscription information request, the subscription information request may determine, according to subscription information between the HSS and the operator, that is, an external group ID, an SCS ID, and the like, whether to expose the MBMS capability to the third party. If the HSS determines to expose the MBMS capability to the third party, the HSS sends, to the SCEF, a subscription information response representing that the exposure of the MBMS capability is allowed, and the subscription information response is also equivalent to the second response message in the foregoing embodiment.

If the subscription information request includes the MBMS media capability exposure request indication and does not include the MBMS capability negotiation parameter, it may be understood that the MBMS pipe capability includes an MBMS media capability. When the HSS determines to allow the exposure of the MBMS pipe capability, because the MBMS capability negotiation parameter is not carried, a subscription information response including an MBMS capability exposure request indication is returned to the SCEF when no specific capability determining is performed to determine which media capability is to be exposed, so that the SCEF further requests the BM-SC exposed MBMS media capability information.

If the subscription information request does not include the MBMS media capability exposure request indication, but includes the MBMS capability negotiation parameter, it may be understood that the MBMS pipe capability is represented in the MBMS capability negotiation parameter. If the HSS receives the subscription information request, when determining, according to the subscription information between the HSS and the operator, to expose the MBMS pipe capability, the HSS further determines, according to the MBMS capability negotiation parameter and the subscription information, which MBMS capability is to be exposed to a third party, and returns the determined MBMS capability information to the SCEF by using a subscription information response.

If the subscription information request includes both the MBMS media capability exposure request indication and the MBMS capability negotiation parameter, it may be understood that the MBMS pipe capability and an MBMS media capability are in parallel, the HSS first determines, according to the subscription information, whether to expose the MBMS pipe capability. If the HSS determines to expose the MBMS pipe capability, the HSS further determines, according to the MBMS capability negotiation parameter and the subscription information, which MBMS capability is to be exposed, and returns, to the SCEF, a subscription information response that includes an MBMS capability exposure request indication and the determined to-be-exposed MBMS capability information, so that the SCEF further requests specific MBMS capability information from the BM-SC.

An MBMS pipe represents a capability of data transmission between two nodes.

205. The SCEF sends a second TMGI allocation request to a BM-SC, where the second TMGI allocation request is used to request to obtain exposed MBMS capability information from the BM-SC.

When the SCEF determines that the HSS allows the exposure of the MBMS capability to the OTT third party, the SCEF sends, to the BM-SC, the second TMGI allocation request that is equivalent to the third request message in the foregoing embodiment. The MBMS capability negotiation parameter or the MBMS capability information that is determined to be exposed by the HSS is added to the second TMGI allocation request, or the foregoing SCS port information, media information, or the like may be further added to the second TMGI allocation request.

That is, if the HSS does not specifically perform determining on the MBMS capability exposed to the third party, the SCEF sends the MBMS capability negotiation parameter obtained from the third-party server to the BM-SC, so that the BM-SC determines, according to the MBMS capability negotiation parameter and the subscription information between the BM-SC and the operator, which MBMS capability is specifically to be exposed. If the HSS performs capability determining according to the MBMS capability sent by the SCEF, to determine which MBMS is to be exposed to the third party, the BM-SC further determines, according to the subscription information between the BM-SC and the operator, and according to a set of MBMS capabilities in the MBMS capability information that is obtained from the SCEF and that is determined by the HSS, which MBMS capability is further exposed to the third party.

206. The BM-SC determines the exposed MBMS capability information according to the subscription information between the BM-SC and an operator, and sends the MBMS capability information to the SCEF.

The BM-SC determines specific exposed MBMS capability information, that is, arbitrates an exposure attribute based on a capability of the BM-SC. For example, the specific MBMS capability information includes a dynamic unicast/broadcast conversion capability and a media transcoding capability. In addition, the BM-SC returns the determined specific MBMS capability information to the SCEF. The specific MBMS capability information may be carried in the first TMGI allocation response message (allocate TMGI response).

The BM-SC may provide, at the same time, port information of the BM-SC (BM-SC port information), a charging rule provided by the BM-SC, media encoding information of the BM-SC, and a service portal link that is used for transporting the video content and that is constructed by the BM-SC according to an arbitration result, for example, a USD URL; and further include an allocated TMGI or the like.

207. The SCEF forwards the MBMS capability information to the third-party server.

The SCEF may add the MBMS capability information, the charging rule, the port information of the BM-SC, the service portal link for transporting the video content, and the encoding information of the BM-SC that are received from the BM-SC to the second TMGI allocation response message, and forwards the second TMGI allocation response message to the third-party server SCS/AS. In this case, the third-party server is triggered to redirect a request of the UE to a broadcast reception mode, to receive the video content.

For the foregoing description, it is assumed that the third-party server requests 10 capabilities (features) from the SCEF. According to different charging fees or an operator policy, the BM-SC provides five of the capabilities, and then returns the five capabilities to the third-party server by using the SCEF. The third-party server can use only the five capabilities with the UE/BM-SC.

For example, in a transport mode indication, there are three options for a transmission mode: a broadcast mode, a broadcast/unicast hybrid mode, and a dynamic broadcast/unicast mode. The broadcast mode means that the BM-SC provides only a broadcast capability, and only UE falling within a coverage area of the MBMS can receive media content, and UE falling outside the coverage area of the MBMS can only obtain media content from an OTT unicast server. The broadcast/unicast hybrid mode means that the 3GPP network provides a unicast/broadcast hybrid transmission capability, and when the UE falls outside the coverage area of the MBMS, the UE may obtain media content from a 3GPP network unicast server. In the dynamic broadcast/unicast mode, the UE can still obtain media content from the 3GPP network, but the 3GPP network selects an optimal transport manner to send the content to the UE. A difference between such a method and a hybrid unicast/broadcast mode lies in that: a coverage area of an MBMS in the hybrid unicast/broadcast mode is semi-static. After the coverage area of the MBMS is selected, although there is a small quantity of receiving users, the mode is still a broadcast mode, and although there is a large quantity of users outside the coverage area of the MBMS, media content can be obtained only in a unicast mode. For the dynamic unicast/broadcast mode, a broadcast mode or a unicast mode may be dynamically selected according to a user density status within an area, so that a network transmission capacity can be optimally used. When the OTT third party inquiries, by using a standard open interface, an operator network (SCEF) to query a video capability supported by the BM-SC, and negotiates with the operator network on the transmission mode, in a broadcast-only mode, the OTT still needs to configure a unicast server, while in the hybrid unicast/broadcast mode, the OTT does not need to configure a unicast server, but a 3GPP network capacity is not efficiently used. In the dynamic unicast/broadcast, use of the 3GPP network capacity is maximized. The three different transmission modes may correspond to different charging fees.

For another example, for a content caching capability, if the OTT third party does not inquire, by using the standard open interface, the operator network (SCEF) to query the video capability supported by the BM-SC, and it is assumed that the BM-SC does not support the content caching capability, a subsequent unicast request of the UE is still provided by the OTT third party, the OTT third party needs to configure a large quantity of unicast servers, and needs a large server capacity. On the contrary, if the OTT third party interacts with the SCEF of the 3GPP network, to request for invoking an MBMS video support capability of the BM-SC of the 3GPP network, and the BM-SC supports the content caching capability, a subsequent unicast request of the UE is provided by a unicast server of the 3GPP network. The unicast server of the 3GPP network may obtain already cached content from the BM-SC, or the BM-SC provides 3GPP network unicast server supporting. In this case, the OTT third party does not need to be concerned with a problem of server capacity.

It may be understood that the MBMS capability negotiation parameter and the MBMS capability information may be sent by using a single message.

A process of starting an MBMS broadcast and distributing the video content according to the exposed MBMS capability information may be as follows:

208. The third-party server notifies, by means of HTTP interaction between the third-party server and UE, the UE of a service portal link for transporting the video content.

209. The third-party server requests the SCEF to start an MBMS broadcast.

The third-party server may specifically send, to the SCEF, a request message group message request, which may include an external group ID, an SCS ID, and the like.

210. The SCEF performs, according to the foregoing context, authorization check on the request sent by the third-party server.

211. If it is determined, according to the authorization check, to start the MBMS broadcast, the SCEF queries the HSS whether the third-party server can use an MBMS channel.

Specifically, the SCEF may send, to the HSS, subscriber information request, which includes an external group ID, an SCS ID, and the like, so that the HSS determines, according to the subscription information, whether the third-party server can use an MBMS channel.

212. If the HSS determines that the third-party server can use an MBMS channel, the HSS sends a determining response (subscriber information response) to the SCEF.

213. The SCEF starts the MBMS broadcast.

214. The SCEF sends an MBMS enabling acknowledgment message to the third-party server.

If step 208 is not performed, step 215 may be performed after step 214, that is, the service portal link for transporting the video content may be notified to the UE by the third-party server or by the SCEF, and either of step 208 and step 215 may be selected.

215. The SCEF communicates with the UE, and notifies the UE of the service portal link for transporting the video content, a UE-side MBMS client is ready, and the third-party server sends the video content to the BM-SC/SCEF.

Optionally, in step 206, a USD URL constructed by the BM-SC may not need to be carried, but the domain name address of the BM-SC is carried. In this way, after the domain name address is notified to the UE by using the SCEF or the AS, the UE may parse the domain name address, and learn that the USD URL is obtained from the BM-SC. That is, the service portal link for transporting the video content may be the domain name address of the BM-SC.

216. The SCEF sends a bearer activation request message (activate MBMS bearer request) to the BM-SC.

217. The BM-SC establishes an MBMS bearer.

218. The BM-SC sends an MBMS bearer establishment success message (activate MBMS bearer response) to the SCEF.

219. The BM-SC starts a broadcast, and sends the content obtained from the third-party server to a broadcast bearer.

220. The third-party server continuously pushes the video content to the BM-SC/SCEF.

221. The UE obtains the video content by using an MBMS bearer.

The UE obtains the video content by using the MBMS bearer according to an obtained service portal link USD URL of the video content that is provided by the BM-SC.

It may be understood that, if the MBMS capability negotiation parameter sent by the third-party server to the SCEF further includes at least one of an indication showing that QoE is to be reported, an indication showing that network information is to be reported, or an indication showing that advertisement purchasing information is to be reported, after the third-party server distributes the video content to the UE by using the BM-SC or the SCEF, the BM-SC further needs to report at least one of QoE, network information, or advertisement purchasing information to the third-party server, or the UE reports such information to the third-party server by using the SCEF. This is not limited in the present disclosure.

It should be noted that if media encoding information returned by the BM-SC is different from media encoding information requested by the third-party server, the third-party server needs to transcode the video content according to the media encoding information provided by the BM-SC. Certainly, if the BM-SC provides a content transcoding service, the third-party server may directly send the video content to the BM-SC, the BM-SC transcodes a media format to a content format supported by the UE, and then the BM-SC sends the content to the UE.

Figure 3A:
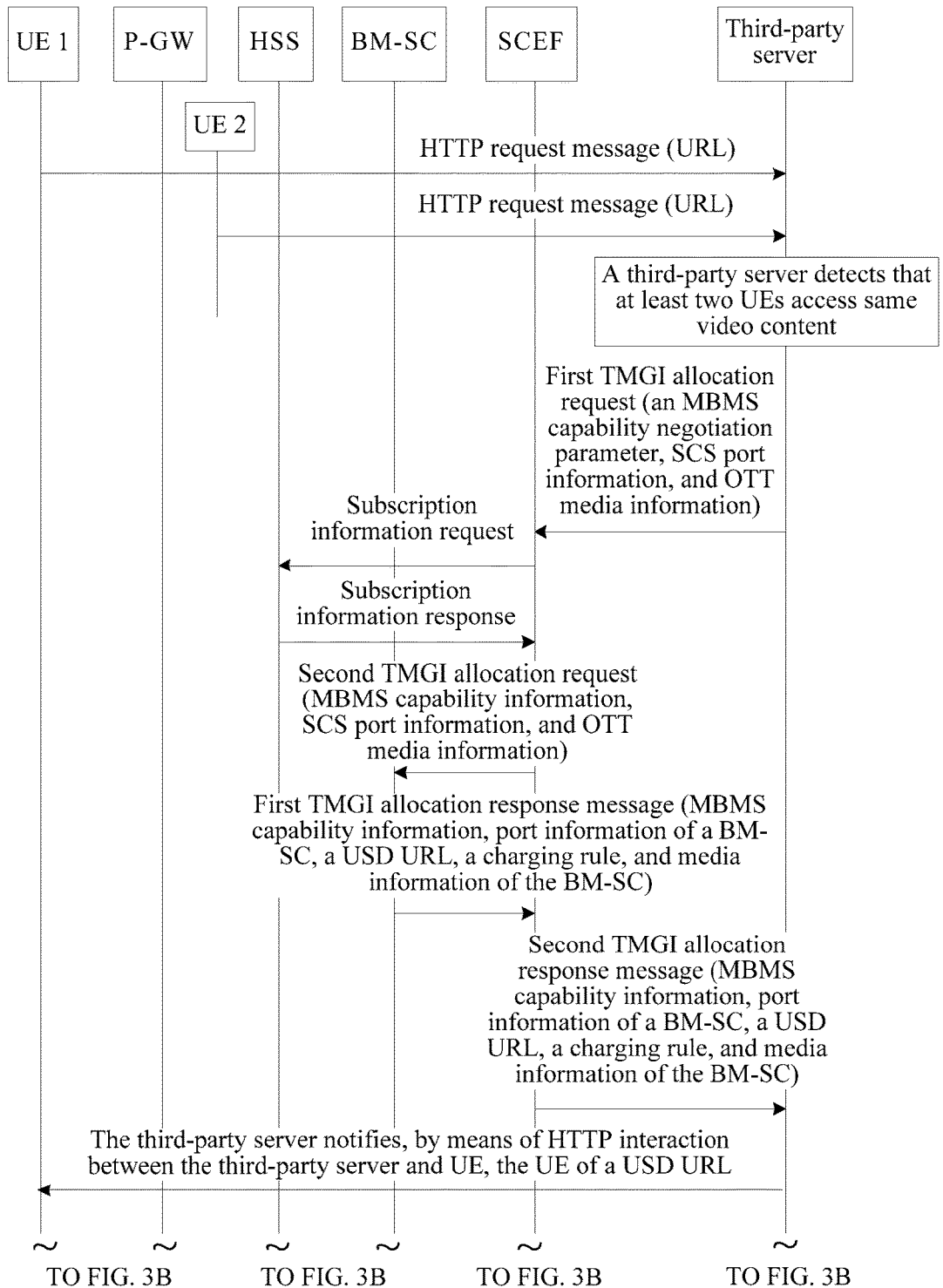
FIG. 3A and FIG. 3B are a schematic information interaction diagram of a video distribution method according to an embodiment of the present invention.
Figure 3B:
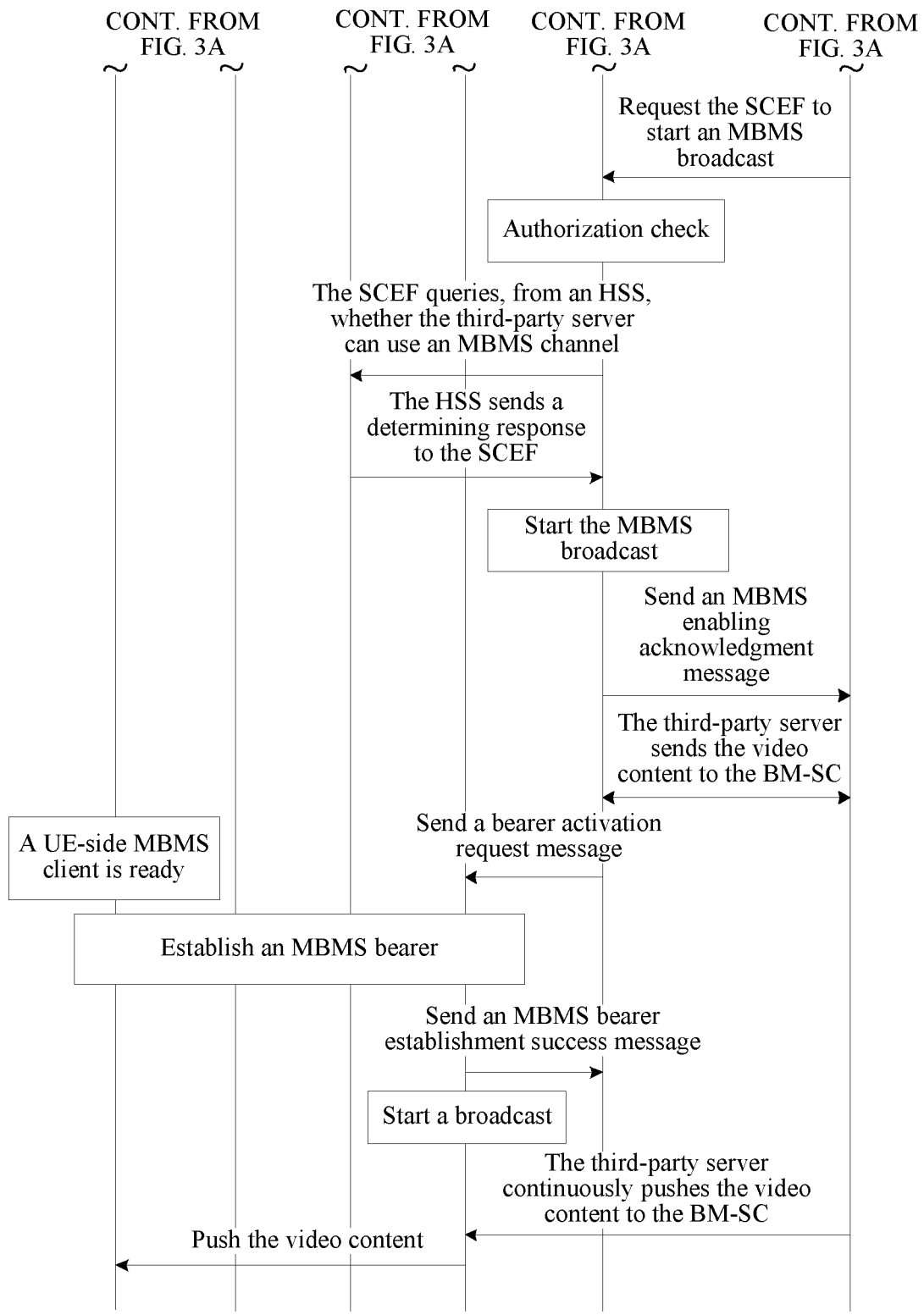

For interaction between network elements in this embodiment, refer to FIG. 3.

Therefore, in this embodiment of the present invention, when the UE first accesses the third-party server, if the third-party server detects that multiple UEs access same video content, the third-party server interacts with an SCEF of a 3GPP network, to request for invoking an MBMS video support capability of the 3GPP network. The 3GPP network allows enabling of the MBMS video support capability, and then the third-party server redirects requests of the UEs to a broadcast reception mode, to receive the video content. By means of the present application, the MBMS capability may be expanded to OTT video supporting. In this way, an OTT third party does not need to perform negotiation and testing with different operators and different terminals, and technical difficulty of the OTT in providing a video service is reduced. This is equivalent to outsourcing video transmission work to an operator network by the OTT third party. By using an open transport and the MBMS capability negotiation parameter, the OTT third party does not need to perform negotiation and testing with different operators separately for parameters such as different pipes or video supporting capabilities of terminals. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 4A:
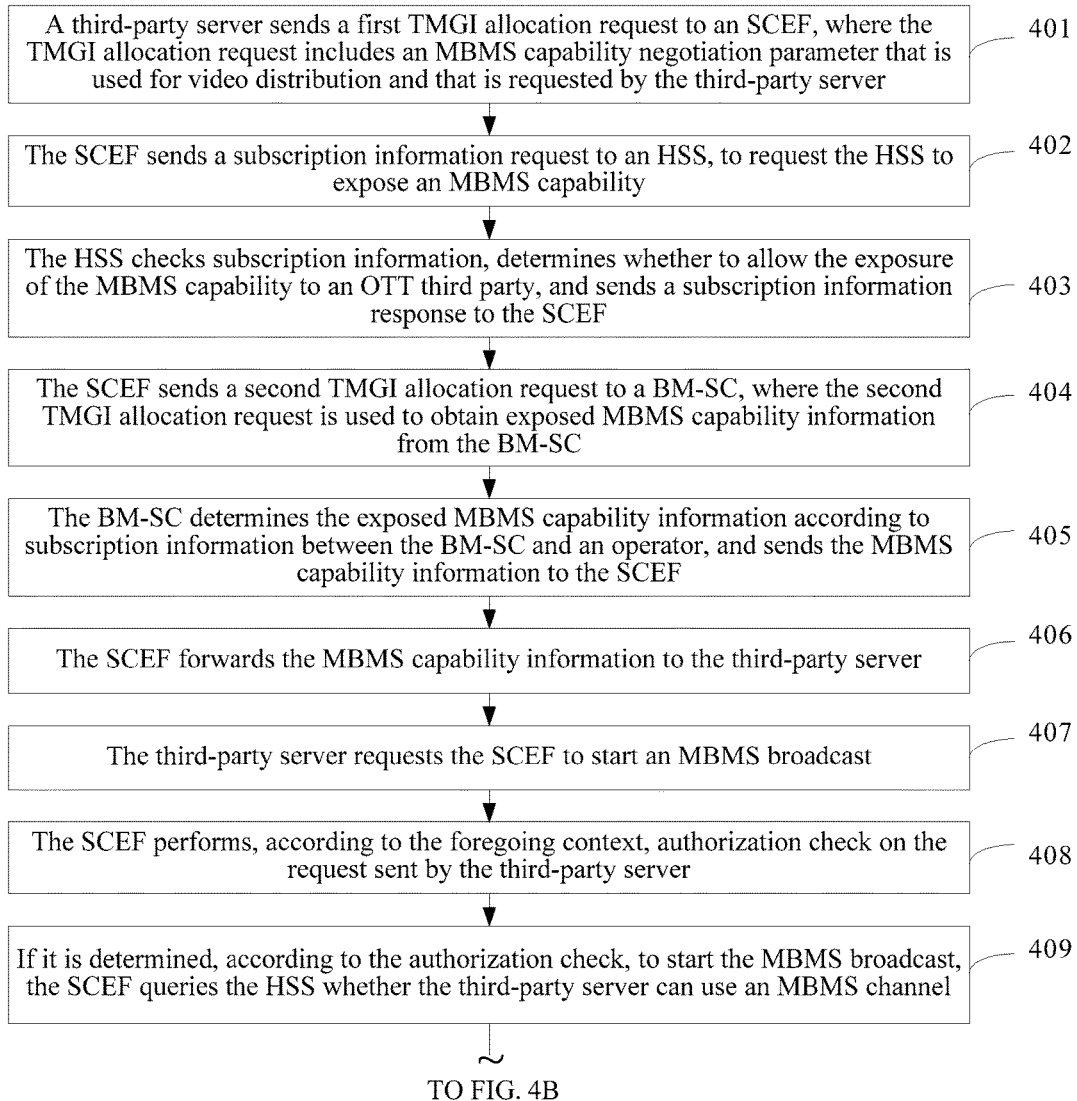
FIG. 4A and FIG. 4B are a schematic flowchart of a video distribution method according to an embodiment of the present invention.
Figure 4B:
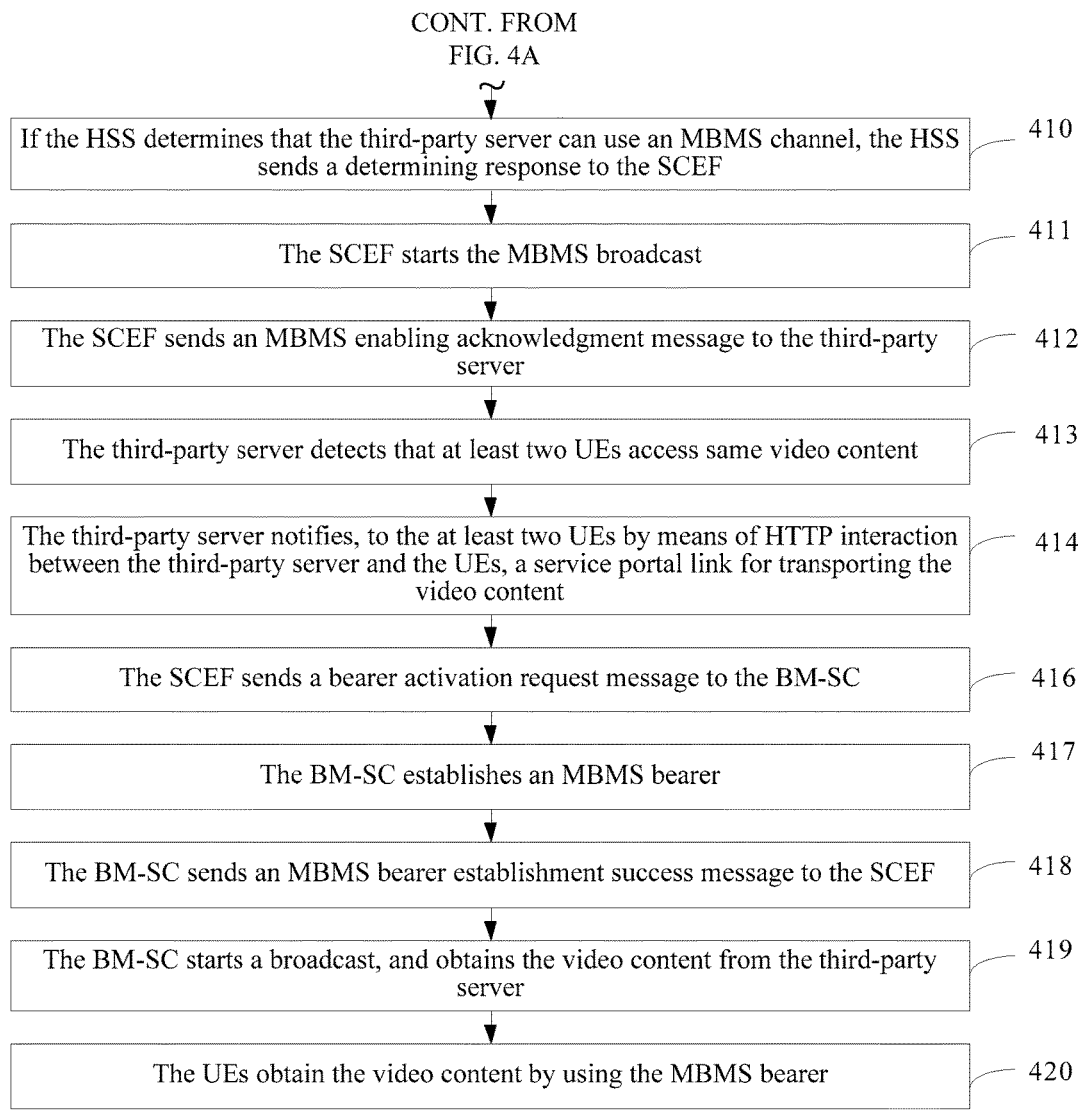

When a third-party server requests in advance a 3GPP network to expose an MBMS capability, another embodiment of the present invention provides a video distribution method. As shown in FIG. 4, the method includes the following steps.

401. A third-party server sends a first TMGI allocation request to an SCEF, where the first TMGI allocation request includes an MBMS capability negotiation parameter for video distribution, the MBMS capability negotiation parameter being requested by the third-party server.

402. The SCEF sends a subscription information request to an HSS, to request the HSS to expose an MBMS capability.

403. The HSS checks subscription information, determines whether to allow the exposure of the MBMS capability to an OTT third party, and sends a subscription information response to the SCEF.

404. The SCEF sends a second TMGI allocation request to a BM-SC, where the second TMGI allocation request is used to obtain exposed MBMS capability information from the BM-SC.

405. The BM-SC determines the exposed MBMS capability information according to subscription information between the BM-SC and an operator, and sends the MBMS capability information to the SCEF.

406. The SCEF forwards the MBMS capability information to the third-party server.

For a specific implementation of step 401 to step 406, refer to step 202 to step 207 in the foregoing embodiment.

407. The third-party server requests the SCEF to start an MBMS broadcast.

The third-party server may specifically send a request message group message request to the SCEF, where the message may include the foregoing external group ID, SCS ID, port information of an SCS, and the like.

408. The SCEF performs, according to the foregoing context, authorization check on the request sent by the third-party server.

409. If it is determined, according to the authorization check, to start the MBMS broadcast, the SCEF queries the HSS whether the third-party server can use an MBMS channel.

410. If the HSS determines that the third-party server can use an MBMS channel, the HSS sends a determining response to the SCEF.

411. The SCEF starts the MBMS broadcast.

412. The SCEF sends an MBMS enabling acknowledgment message to the third-party server.

413. The third-party server detects that at least two UEs access same video content.

For example, UE 1 sends an HTTP request message (including a URL) to the third-party server, and UE 2 also sends an HTTP request to the third-party server to request video content corresponding to the same URL.

414. The third-party server notifies, to the at least two UEs by means of HTTP interaction between the third-party server and the UEs, a service portal link for transporting the video content.

Specifically, the third-party server may send an HTTP redirection message to the UE 1 and the UE 2 separately. The HTTP redirection message includes a USD URL provided by the BM-SC, and redirects the UE to receive the video content by means of broadcast.

Alternatively, step 414 is replaced with step 415.

415. The BM-SC communicates with the UEs, to notify the UEs of the service portal link for transporting the video content, and that a UE-side MBMS client is ready.

It may be understood that, in step 405, the USD URL may not be carried, and instead, a domain name address of the BM-SC is carried. In this way, the domain name address may be notified to the UEs by using the third-party server or the BM-SC, so that the UEs obtain the USD URL from the BM-SC according to the domain name address. That is, the service portal link for transporting the video content may be the domain name address of the BM-SC.

416. The SCEF sends a bearer activation request message to the BM-SC.

417. The BM-SC establishes an MBMS bearer.

418. The BM-SC sends an MBMS bearer establishment success message to the SCEF.

419. The BM-SC starts a broadcast, and obtains the video content from the third-party server.

420. The UEs obtain the video content by using the MBMS bearer.

Figure 5:
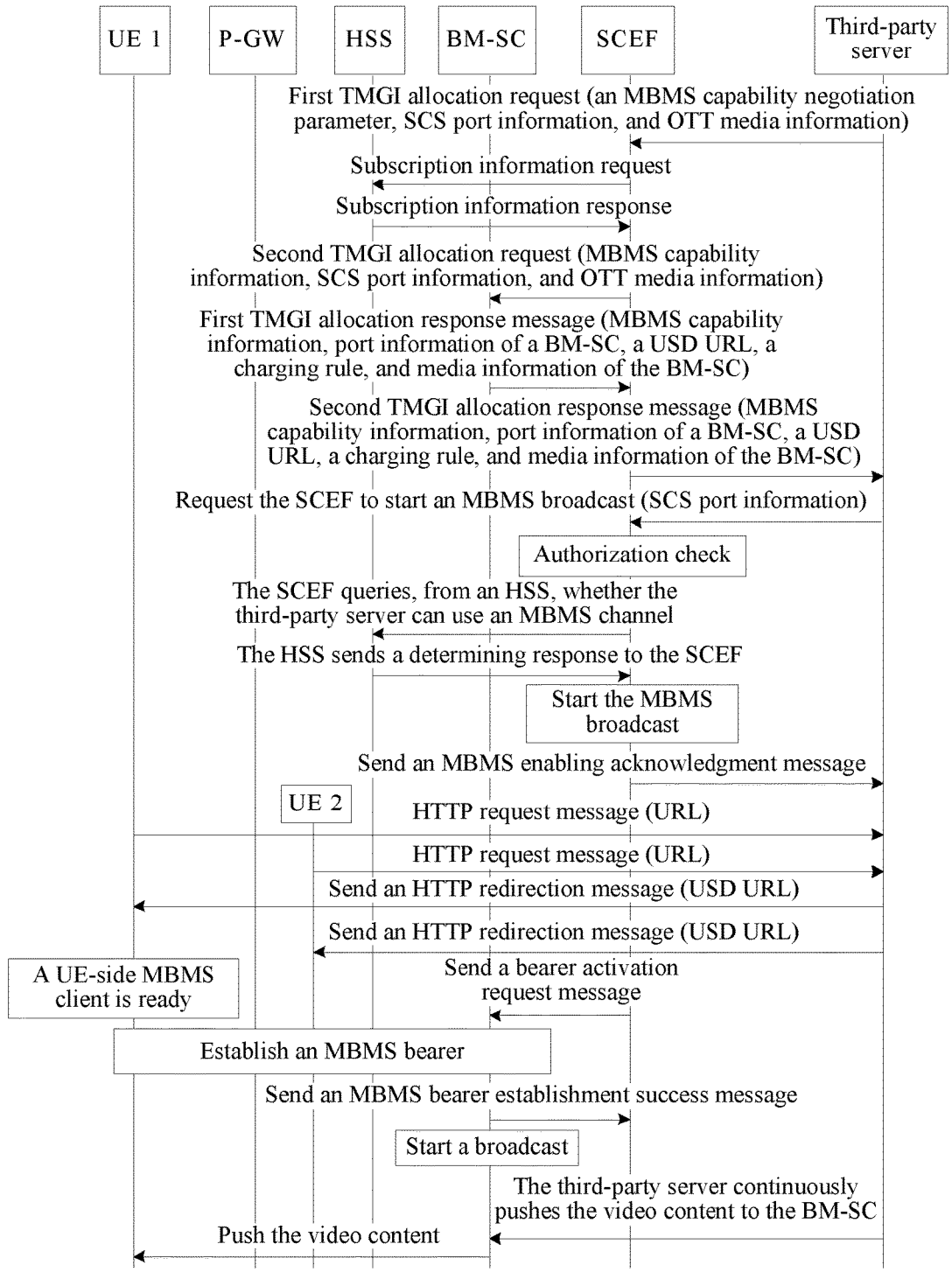
FIG. 5 is a schematic information interaction diagram of a video distribution method according to an embodiment of the present invention.

For interaction between network elements in this embodiment, refer to FIG. 5.

Therefore, in this embodiment of the present invention, the third-party server requests in advance an MBMS capability exposure resource from a 3GPP network. The 3GPP network allows enabling of an MBMS video support capability. After detecting access requests of at least two UEs, the third-party server redirects the requests of the UEs to a broadcast reception mode, to receive video content. By means of the present application, the MBMS capability may be expanded to OTT video supporting. In this way, an OTT third party does not need to perform negotiation and testing with different operators and different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 6:
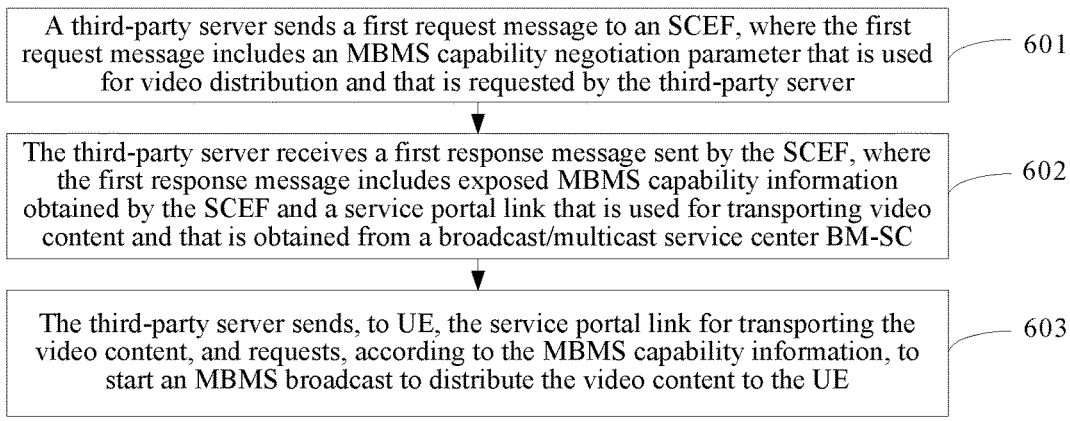
FIG. 6 is a schematic flowchart of a video distribution method according to an embodiment of the present invention.

Based on the description of the foregoing embodiment, execution procedures for the third-party server, the BM-SC, and the HSS may be as follows:

An embodiment of the present invention provides a video distribution method. As shown in FIG. 6, the method includes the following steps.

601. A third-party server sends a first request message to an SCEF, where the first request message includes an MBMS capability negotiation parameter for video distribution, the MBMS capability negotiation parameter being requested by the third-party server.

The MBMS capability negotiation parameter includes at least one of a transport mode indication of video content, a security feature indication for using an MBMS, a content transcoding capability support indication, a content caching indication, a quality of experience QoE reporting indication, a network information reporting indication, an advertisement purchasing information indication, or an advertisement insertion capability indication. The transport mode indication is a broadcast mode, or a broadcast/unicast hybrid mode, or a dynamic broadcast/unicast mode. The security feature indication is an enabled state or a disabled state. The content transcoding capability support indication is an indication showing that transcoding is supported or an indication showing that transcoding is not supported. The content caching indication is an indication showing that content caching is supported or an indication showing that content caching is not supported. The QoE reporting indication is an indication showing that QoE is to be reported or an indication showing that QoE is not to be reported. The network information reporting indication is an indication showing that network information is to be reported or an indication showing that network information is not to be reported. The network information includes at least one of a UE identifier, a serving cell identifier, or a network congestion state. The advertisement purchasing information indication is an indication showing that an event of purchasing advertisement content by a user is to be reported or an indication showing that an event of purchasing advertisement content by a user is not to be reported. The advertisement insertion capability indication is an indication showing that insertion of an advertisement is supported or an indication showing that insertion of an advertisement is not supported.

The first request message further includes port information of the third-party server and media encoding information of the third-party server. The port information of the third-party server is used for trusted channel data transmission between the third-party server and a BM-SC. The media encoding information of the third-party server includes at least one of video encoding information, audio encoding information, text encoding information, or picture encoding information.

602. The third-party server receives a first response message sent by the SCEF, where the first response message includes exposed MBMS capability information obtained by the SCEF and a service portal link that is used for transporting video content and that is obtained from a broadcast multicast service center BM-SC.

Before the sending, by a third-party server, a first request message to an SCEF, or after the receiving, by the third-party server, a first response message sent by the SCEF, the method further includes: receiving, by the third-party server, Hypertext Transfer Protocol HTTP request messages sent by at least two UEs, where the HTTP request message is used to request same video content.

603. The third-party server sends, to UE, the service portal link for transporting the video content, and requests, according to the MBMS capability information, to start an MBMS broadcast to distribute the video content to the UE.

After the sending, by the third-party server to user equipment UE, the service portal link for transporting the video content, the method further includes: sending, by the third-party server, the video content to the BM-SC, so that the UE obtains the video content by using an MBMS bearer.

For a specific implementation of the third-party server, refer to the embodiment shown in FIG. 1 to FIG. 5. Details are not described herein again.

This embodiment of the present invention provides a video distribution method. The third-party server sends a first request message to the service capability exposure function SCEF, where the first request message includes a multimedia broadcast multicast service MBMS capability negotiation parameter for video distribution, the MBMS capability negotiation parameter being requested by the third-party server, receives a first response message sent by the SCEF, where the first response message includes exposed MBMS capability information obtained by the SCEF and a service portal link that is obtained by the broadcast multicast service center BM-SC and that is used for transporting video content, sends, to the UE, the video content for transporting the service portal link, and starts an MBMS broadcast according to the MBMS capability information, to distribute the video content to the UE. That is, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter. The third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 7:
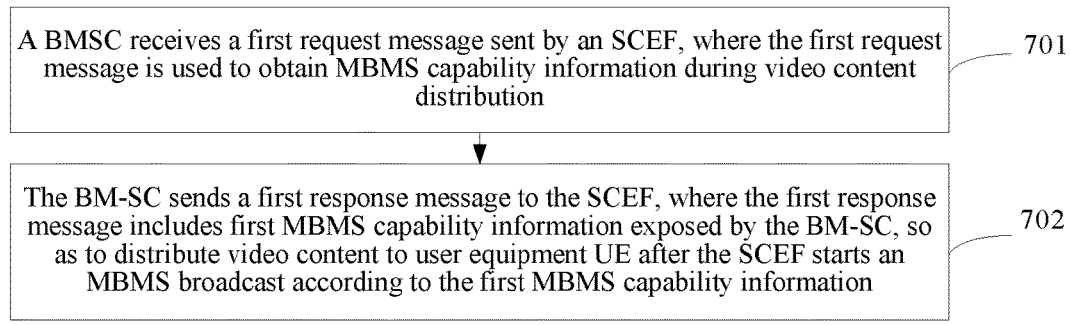
FIG. 7 is a schematic flowchart of a video distribution method according to an embodiment of the present invention.

An embodiment of the present invention provides a video distribution method. As shown in FIG. 7, the method includes the following steps.

701. A BM-SC receives a first request message sent by an SCEF, where the first request message is used to obtain MBMS capability information during video content distribution.

The first request message includes an MBMS capability negotiation parameter for video distribution and that is requested by a third-party server, or the first request message includes second MBMS capability information that is to be exposed and that is determined by a home subscriber server HSS according to the MBMS capability negotiation parameter obtained from the third-party server.

The first request message further includes port information and media encoding information of the third-party server. The port information of the third-party server is used for trusted channel data transmission between the third-party server and the BM-SC. The media encoding information of the third-party server includes at least one of video encoding information, audio encoding information, text encoding information, or picture encoding information.

702. The BM-SC sends a first response message to the SCEF, where the first response message includes first MBMS capability information exposed by the BM-SC, so as to distribute video content to user equipment UE after the SCEF starts an MBMS broadcast according to the first MBMS capability information.

The first response message includes port information of the BM-SC, a service portal link for transporting the video content, a charging rule, and media encoding information of the BM-SC. The port information of the BM-SC is used for trusted channel data transmission between the BM-SC and the third-party server. The media encoding information includes at least one of video encoding information, audio encoding information, text encoding information, or picture encoding information.

Before the sending, by the BM-SC, a first response message to the SCEF, the method further includes:

determining, by the BM-SC according to the MBMS capability negotiation parameter and subscription information between the BM-SC and an operator, the first MBMS capability information exposed by the BM-SC; or determining, by the BM-SC according to the second MBMS capability information that is to be exposed and that is determined by the HSS and subscription information between the BM-SC and the operator, the first MBMS capability information exposed by the BM-SC.

After the sending, by the BM-SC, a first response message to the SCEF, the method further includes:

sending, by the BM-SC to the UE, the service portal link for transporting the video content; and receiving, by the BM-SC according to the port information of the BM-SC, video content sent by the third-party server, and sending the video content to the UE.

The MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

This embodiment of the present invention provides a video distribution method. The BM-SC receives a first request message sent by the SCEF, where the first request message is used to obtain multimedia broadcast multicast service MBMS capability information during video content distribution. The BM-SC sends a first response message to the SCEF, where the first response message includes the first MBMS capability information exposed by the BM-SC, so that the BM-SC and the SCEF start an MBMS broadcast according to the first MBMS capability information, to distribute video content to the user equipment UE. In this way, when multiple UEs access the video content, an OTT third party may interact with an SCEF of a 3GPP and the BM-SC, and negotiates with the BM-SC to determine a to-be-exposed MBMS capability according to the MBMS capability negotiation parameter, so that the third-party server redirects requests of the UEs to a broadcast reception mode, to receive the video content, so as to expand the MBMS capability to OTT video supporting. In this way, the OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 8:
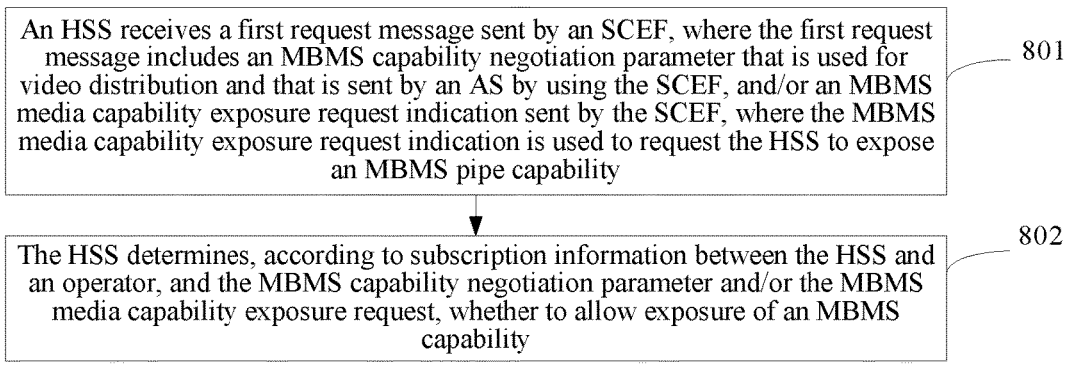
FIG. 8 is a schematic flowchart of a video distribution method according to an embodiment of the present invention.

An embodiment of the present invention provides a video distribution method. As shown in FIG. 8, the method includes the following steps.

801. An HSS receives a first request message sent by an SCEF, where the first request message includes an MBMS capability negotiation parameter for video distribution and that is sent by an AS by using the SCEF, and/or an MBMS media capability exposure request indication sent by the SCEF, where the MBMS media capability exposure request indication is used to request the HSS to expose an MBMS pipe capability.

802. The HSS determines, according to subscription information between the HSS and an operator, and the MBMS capability negotiation parameter and/or the MBMS media capability exposure request, whether to allow exposure of an MBMS capability.

If the first request message includes the MBMS capability negotiation parameter, when the HSS determines to allow the exposure of the MBMS capability, the method further includes:

determining, by the HSS, exposed MBMS capability information according to the subscription information and the MBMS capability negotiation parameter; and sending, by the HSS, a first response message to the SCEF, where the first response message includes the MBMS capability information.

If the first request message includes the MBMS media capability exposure request indication, and the HSS determines to allow the exposure of the MBMS capability, the first response message includes an MBMS capability exposure request indication, to notify the SCEF that the exposure of the MBMS capability is allowed.

The MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

This embodiment of the present invention provides a video distribution method. The HSS receives a first request message sent by the SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability. The HSS determines, according to subscription information between the HSS and an operator, and the MBMS capability negotiation parameter and/or the MBMS media capability exposure request, whether to allow the exposure of the MBMS capability. In this way, when multiple UEs access the video content, an OTT third party may interact with an SCEF of a 3GPP and the HSS, and obtain, from the HSS, an indication for allowing the exposure of the capability, so that the third-party server negotiates with the BM-SC to determine a to-be-exposed MBMS capability according to the MBMS capability negotiation parameter, so that the third-party server redirects requests of the UEs to a broadcast reception mode, to receive the video content, so as to expand the MBMS capability to OTT video supporting. In this way, the OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 9:
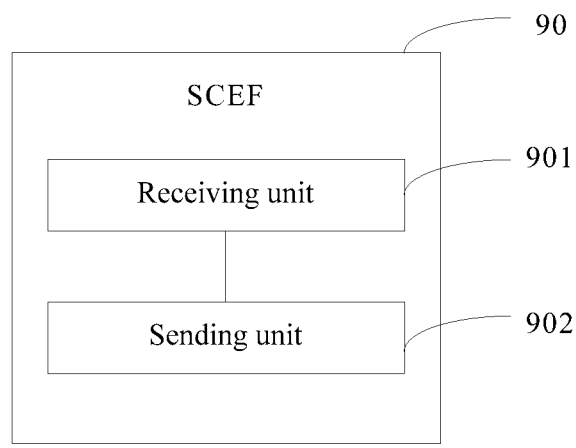
FIG. 9 is a schematic structural diagram of an SCEF according to an embodiment of the present invention.

An embodiment of the present invention provides an SCEF 90. As shown in FIG. 9, the SCEF 90 includes:

a receiving unit 901, configured to receive a first request message sent by a third-party server, where the first request message includes a multimedia broadcast multicast service MBMS capability negotiation parameter for video distribution, the MBMS capability negotiation parameter being requested by the third-party server; and a sending unit 902, configured to send a second request message to a home subscriber server HSS according to the first request message, to request the HSS to expose an MBMS capability.

The sending unit 902 is further configured to send a third request message to a broadcast multicast service center BM-SC when the receiving unit receives a second response message returned by the HSS when the HSS determines to allow the exposure of the MBMS capability, to request first MBMS capability information exposed by the BM-SC.

The sending unit 902 is further configured to send the first MBMS capability information obtained from the BM-SC to the third-party server, to enable the-third party server to request, according to the first MBMS capability information, to start an MBMS broadcast, and distributes video content to user equipment UE.

Optionally, the first request message further includes port information of the third-party server and media encoding information of the third-party server.

The second request message includes the MBMS capability negotiation parameter and/or an MBMS media capability exposure request indication, and the MBMS media capability exposure request indication is used to request the HSS to expose an MBMS pipe capability.

If the second request message includes the MBMS capability negotiation parameter, the second response message includes second MBMS capability information that is to be exposed and that is determined by the HSS according to subscription information between the HSS and an operator and the MBMS capability negotiation parameter.

If the second request message includes the MBMS media capability exposure request indication, the second response message includes an MBMS capability exposure request indication, and the MBMS capability exposure request indication is used to request the first MBMS capability information exposed and determined by the BM-SC.

The third request message includes the port information of the third-party server and the media encoding information of the third-party server.

If the second response message includes the second MBMS capability information, the third request message further includes the second MBMS capability information. If the second response message does not include the second MBMS capability information, the third request message further includes the MBMS capability negotiation parameter.

Optionally, the receiving unit 901 is further configured to:

receive a third response message sent by the BM-SC, where the third response message includes the first MBMS capability information, a service portal link for transporting the video content, port information of the BM-SC, a charging rule, and media encoding information of the BM-SC.

Optionally, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

The port information of the third-party server is used for trusted channel data transmission between the third-party server and the BM-SC. The port information of the BM-SC is used for trusted channel data transmission between the BM-SC and the third-party server. The media encoding information includes at least one of video encoding information, audio encoding information, text encoding information, or picture encoding information.

This embodiment of the present invention provides an SCEF. The SCEF receives a first request message sent by the third-party server, where the first request message includes a multimedia broadcast multicast service MBMS capability negotiation parameter for video distribution, the MBMS capability negotiation parameter being requested by the third-party server, and sends a second request message to the home subscriber server HSS according to the first request message, to request the HSS to expose an MBMS capability. The SCEF sends a third request message to the broadcast multicast service center BM-SC after the SCEF receives a second response message returned by the HSS when the HSS determines to allow the exposure of the MBMS capability, to request to obtain MBMS capability information exposed by the BM-SC. The SCEF sends the exposed MBMS capability information obtained from the BM-SC to the third-party server, so that the third-party server starts an MBMS broadcast according to the exposed MBMS capability information and distributes video content to the user equipment UE. That is, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter. The third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 10:
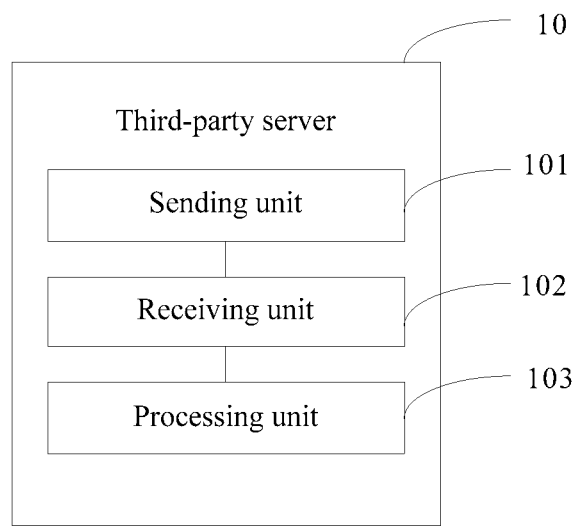
FIG. 10 is a schematic structural diagram of a third-party server according to an embodiment of the present invention.

An embodiment of the present invention provides a third-party server 10. As shown in FIG. 10, the third-party server 10 includes:

a sending unit 101, configured to send a first request message to a service capability exposure function SCEF, where the first request message includes a multimedia broadcast multicast service MBMS capability negotiation parameter for video distribution, the MBMS capability negotiation parameter being requested by the third-party server;

a receiving unit 102, configured to receive a first response message sent by the SCEF, where the first response message includes exposed MBMS capability information obtained by the SCEF and a service portal link that is used for transporting video content and that is obtained from a broadcast multicast service center BM-SC, where the sending unit 101 is further configured to send, to the UE, the service portal link for transporting the video content; and a processing unit 103, configured to request, according to the MBMS capability information, to start an MBMS broadcast to distribute the video content to the UE.

Optionally, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

The first request message further includes port information of the third-party server and media encoding information of the third-party server.

The first response message further includes port information of the BM-SC, media encoding information of the BM-SC, and a charging rule that are obtained by the SCEF.

The port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

Optionally, the receiving unit 102 is further configured to: before the third-party server sends the first request message to the SCEF, or after the third-party server receives the first response message sent by the SCEF, receive Hypertext Transfer Protocol HTTP request messages sent by at least two UEs, where the HTTP request message is used to request same video content.

Optionally, the sending unit 101 is further configured to: after sending, to the user equipment UE, the service portal link for transporting the video content, send the video content to the BM-SC or the SCEF.

This embodiment of the present invention provides a third-party server. The third-party server sends a first request message to the service capability exposure function SCEF, where the first request message includes a multimedia broadcast multicast service MBMS capability negotiation parameter for video distribution, the MBMS capability negotiation parameter being requested by the third-party server, receives a first response message sent by the SCEF, where the first response message includes exposed MBMS capability information obtained by the SCEF and a service portal link that is obtained by the broadcast multicast service center BM-SC and that is used for transporting video content, sends, to the UE, the video content for transporting the service portal link, and starts an MBMS broadcast according to the MBMS capability information, to distribute the video content to the UE. That is, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter. The third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 11:
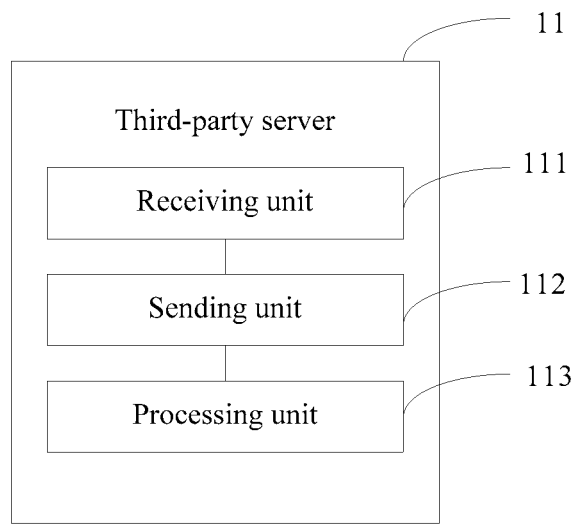
FIG. 11 is a schematic structural diagram of a BM-SC according to an embodiment of the present invention.

An embodiment of the present invention provides a BM-SC 11. As shown in FIG. 11, the BM-SC 11 includes:

a receiving unit 111, configured to receive a first request message sent by a service capability exposure function SCEF, where the first request message is used to obtain multimedia broadcast multicast service MBMS capability information during video content distribution; and a sending unit 112, configured to send a first response message to the SCEF, where the first response message includes first MBMS capability information exposed by the BM-SC, so as to distribute video content to user equipment UE after the SCEF starts an MBMS broadcast according to the first MBMS capability information.

Optionally, the first request message includes an MBMS capability negotiation parameter for video distribution and that is requested by a third-party server, or the first request message includes second MBMS capability information that is to be exposed and that is determined by a home subscriber server HSS according to the MBMS capability negotiation parameter obtained from the third-party server.

The BM-SC further includes: a processing unit 113, configured to determine, according to the MBMS capability negotiation parameter and subscription information between the BM-SC and an operator, the first MBMS capability information exposed by the BM-SC; or the processing unit 113 is configured to determine, according to the second MBMS capability information that is to be exposed and that is determined by the HSS and subscription information between the BM-SC and the operator, the first MBMS capability information exposed by the BM-SC.

Optionally, the first request message further includes port information of the third-party server and media encoding information of the third-party server. The first response message includes port information of the BM-SC, a service portal link for transporting the video content, a charging rule, and media encoding information of the BM-SC.

The port information of the third-party server is used for trusted channel data transmission between the third-party server and the BM-SC. The port information of the BM-SC is used for trusted channel data transmission between the BM-SC and the third-party server. The media encoding information includes at least one of video encoding information, audio encoding information, text encoding information, or picture encoding information.

The MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

Optionally, the sending unit 112 is further configured to send, to the UE, the service portal link for transporting the video content.

The receiving unit 111 is further configured to receive, according to the port information of the BM-SC, video content sent by the third-party server.

The sending unit 112 is further configured to send the video content to the UE.

This embodiment of the present invention provides a BM-SC. The BM-SC receives a first request message sent by the SCEF, where the first request message is used to obtain multimedia broadcast multicast service MBMS capability information during video content distribution. The BM-SC sends a first response message to the SCEF, where the first response message includes the MBMS capability information exposed by the BM-SC, so that the BM-SC and the SCEF start an MBMS broadcast according to the MBMS capability information, to distribute video content to the user equipment UE. In this way, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter, so that the third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 12:
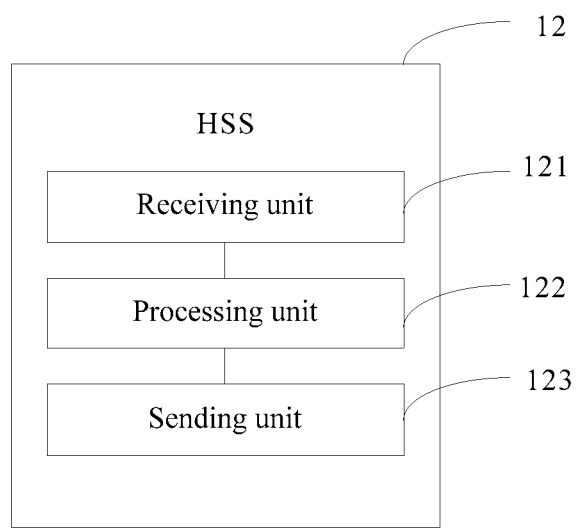
FIG. 12 is a schematic structural diagram of an HSS according to an embodiment of the present invention.

An embodiment of the present invention provides an HSS 12. As shown in FIG. 12, the HSS 12 includes:

a receiving unit 121, configured to receive a first request message sent by a service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability; and a processing unit 122, configured to determine, according to subscription information between the HSS and an operator, and the MBMS capability negotiation parameter and/or the MBMS media capability exposure request, whether to allow the exposure of the MBMS capability.

Optionally, if the first request message includes the MBMS capability negotiation parameter, the processing unit is further configured to determine exposed MBMS capability information according to the subscription information and the MBMS capability negotiation parameter.

The HSS further includes a sending unit 123, configured to send a first response message to the SCEF, where the first response message includes the MBMS capability information.

If the first request message includes the MBMS media capability exposure request indication, and the HSS determines to allow the exposure of the MBMS capability, the first response message includes an MBMS capability exposure request indication, to notify the SCEF that the exposure of the MBMS capability is allowed.

Optionally, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

This embodiment of the present invention provides an HSS. The HSS receives a first request message sent by the service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability. The HSS determines, according to subscription information between the HSS and an operator, and the MBMS capability negotiation parameter and/or the MBMS media capability exposure request, whether to allow the exposure of the MBMS capability. In this way, when multiple UEs access the video content, an OTT third party may interact with an SCEF of a 3GPP and the HSS, and obtain, from the HSS, an indication for allowing the exposure of the capability, so that the third-party server negotiates with the BM-SC to determine a to-be-exposed MBMS capability according to the MBMS capability negotiation parameter, so that the third-party server redirects requests of the UEs to a broadcast reception mode, to receive the video content, so as to expand the MBMS capability to OTT video supporting. In this way, the OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 13:
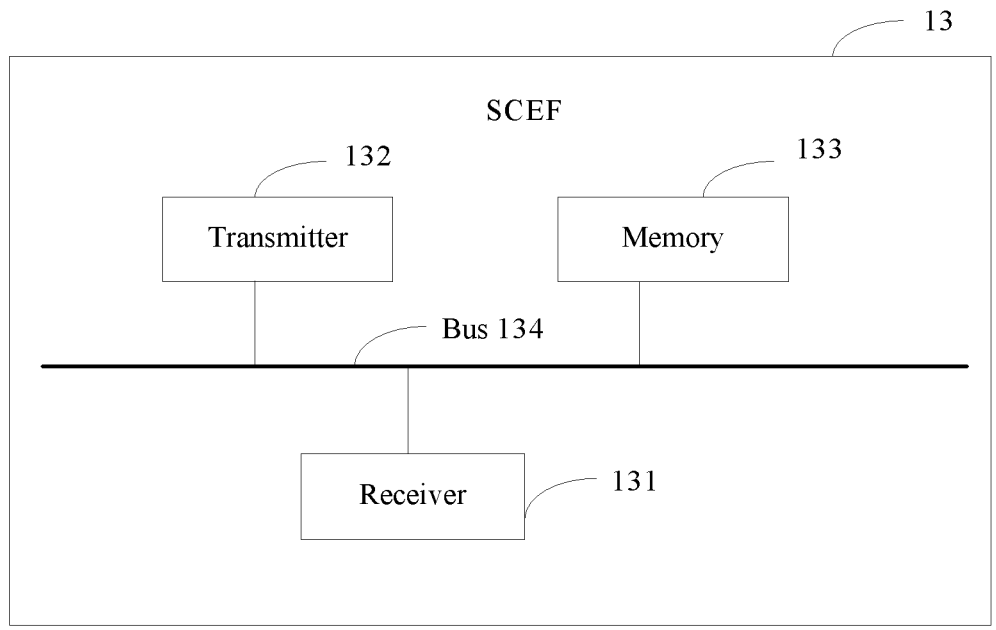
FIG. 13 is a schematic structural diagram of an SCEF according to an embodiment of the present invention.

An embodiment of the present invention provides an SCEF 13. As shown in FIG. 13, the SCEF 13 includes a receiver 131, a transmitter 132, a memory 133, and a bus 134. The memory 133 is configured to store data and an instruction. The receiver 131 executes the instruction and is configured to receive a first request message sent by a third-party server, where the first request message includes a multimedia broadcast multicast service MBMS capability negotiation parameter for video distribution, the MBMS capability negotiation parameter being requested by the third-party server. The transmitter 132 executes the instruction and is configured to send a second request message to a home subscriber server HSS according to the first request message, to request the HSS to expose an MBMS capability. The transmitter 132 executes the instruction and is further configured to send a third request message to a broadcast multicast service center BM-SC when the receiver receives a second response message returned by the HSS when the HSS determines to allow the exposure of the MBMS capability, to request first MBMS capability information exposed by the BM-SC. The transmitter 132 executes the instruction and is further configured to send the first MBMS capability information obtained from the BM-SC to the third-party server, to enable the-third party server to request, according to the first MBMS capability information, to start an MBMS broadcast, and distributes video content to user equipment UE.

In this embodiment of the present invention, optionally, the first request message further includes port information of the third-party server and media encoding information of the third-party server.

The second request message includes the MBMS capability negotiation parameter and/or an MBMS media capability exposure request indication, and the MBMS media capability exposure request indication is used to request the HSS to expose an MBMS pipe capability.

If the second request message includes the MBMS capability negotiation parameter, the second response message includes second MBMS capability information that is to be exposed and that is determined by the HSS according to subscription information between the HSS and an operator and the MBMS capability negotiation parameter.

If the second request message includes the MBMS media capability exposure request indication, the second response message includes an MBMS capability exposure request indication, and the MBMS capability exposure request indication is used to request the first MBMS capability information exposed and determined by the BM-SC.

The third request message includes the port information of the third-party server and the media encoding information of the third-party server.

If the second response message includes the second MBMS capability information, the third request message further includes the second MBMS capability information. If the second response message does not include the second MBMS capability information, the third request message further includes the MBMS capability negotiation parameter.

In this embodiment of the present invention, optionally, the receiver 131 executes the instruction and is further configured to receive a third response message sent by the BM-SC, where the third response message includes the first MBMS capability information, a service portal link for transporting the video content, port information of the BM-SC, a charging rule, and media encoding information of the BM-SC.

In this embodiment, optionally, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

The port information of the third-party server is used for trusted channel data transmission between the third-party server and the BM-SC. The port information of the BM-SC is used for trusted channel data transmission between the BM-SC and the third-party server. The media encoding information includes at least one of video encoding information, audio encoding information, text encoding information, or picture encoding information.

This embodiment of the present invention provides an SCEF. The SCEF receives a first request message sent by the third-party server, where the first request message includes a multimedia broadcast multicast service MBMS capability negotiation parameter for video distribution, the MBMS capability negotiation parameter being requested by the third-party server, and sends a second request message to the home subscriber server HSS according to the first request message, to request the HSS to expose an MBMS capability. The SCEF sends a third request message to the broadcast multicast service center BM-SC after the SCEF receives a second response message returned by the HSS when the HSS determines to allow the exposure of the MBMS capability, to request to obtain MBMS capability information exposed by the BM-SC. The SCEF sends the exposed MBMS capability information obtained from the BM-SC to the third-party server, so that the third-party server starts an MBMS broadcast according to the exposed MBMS capability information and distributes video content to the user equipment UE. That is, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter. The third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 14:
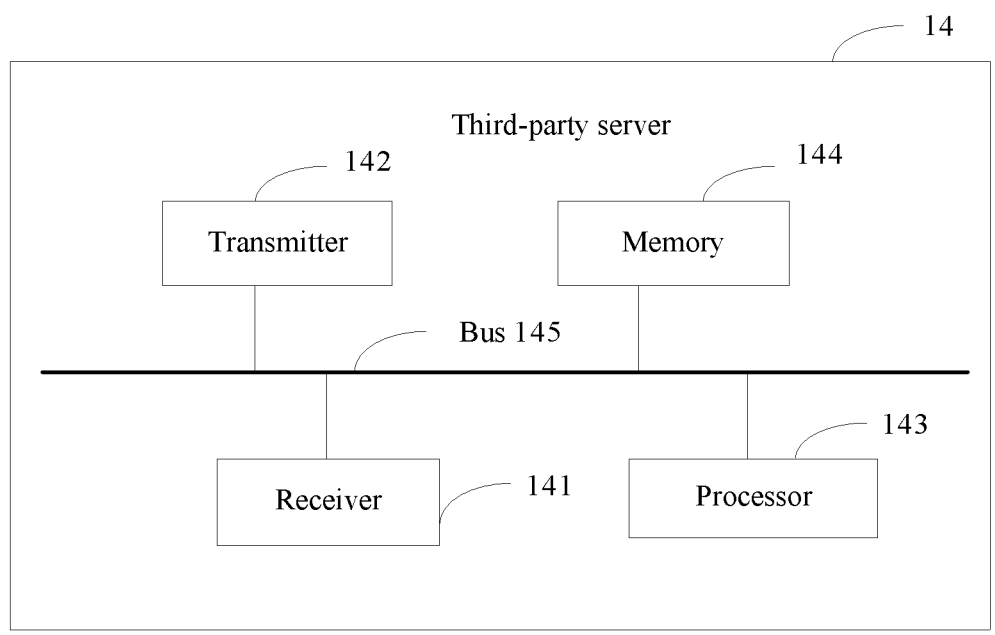
FIG. 14 is a schematic structural diagram of a third-party server according to an embodiment of the present invention.

An embodiment of the present invention provides a third-party server 14. As shown in FIG. 14, the third-party server 14 includes: a receiver 141, a transmitter 142, a processor 143, a memory 144, and a bus 145. The memory 144 is configured to store an instruction and data. The transmitter 142 executes the instruction and is configured to send a first request message to a service capability exposure function SCEF, where the first request message includes a multimedia broadcast multicast service MBMS capability negotiation parameter for video distribution, the MBMS capability negotiation parameter being requested by the third-party server. The receiver 141 executes the instruction and is configured to receive a first response message sent by the SCEF, where the first response message includes exposed MBMS capability information obtained by the SCEF and a service portal link that is used for transporting video content and that is obtained from a broadcast multicast service center BM-SC. The transmitter 142 executes the instruction and is further configured to send, to UE, the service portal link for transporting the video content. The processor 143 executes the instruction and is configured to request, according to the MBMS capability information, to start an MBMS broadcast to distribute the video content to the UE.

In this embodiment of the present invention, optionally, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

The first request message further includes port information of the third-party server and media encoding information of the third-party server.

The first response message further includes port information of the BM-SC, media encoding information of the BM-SC, and a charging rule that are obtained by the SCEF.

The port information of the third-party server is used for trusted channel data transmission between the third-party server and the BM-SC; the port information of the BM-SC is used for trusted channel data transmission between the BM-SC and the third-party server; and the media encoding information includes at least one of video encoding information, audio encoding information, text encoding information, or picture encoding information.

In this embodiment of the present invention, optionally, the receiver 141 executes the instruction and is further configured to: before the transmitter 142 sends the first request message to the SCEF, or after the receiver 141 receives the first response message sent by the SCEF, receive Hypertext Transfer Protocol HTTP request messages sent by at least two UEs, where the HTTP request message is used to request same video content.

In this embodiment of the present invention, optionally, the transmitter 142 executes the instruction and is further configured to: after sending, to the user equipment UE, the service portal link for transporting the video content, send the video content to the BM-SC or the SCEF.

This embodiment of the present invention provides a third-party server. The third-party server sends a first request message to the service capability exposure function SCEF, where the first request message includes a multimedia broadcast multicast service MBMS capability negotiation parameter for video distribution, the MBMS capability negotiation parameter being requested by the third-party server, receives a first response message sent by the SCEF, where the first response message includes exposed MBMS capability information obtained by the SCEF and a service portal link that is obtained by the broadcast multicast service center BM-SC and that is used for transporting video content, sends, to the UE, the video content for transporting the service portal link, and starts an MBMS broadcast according to the MBMS capability information, to distribute the video content to the UE. That is, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter. The third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 15:
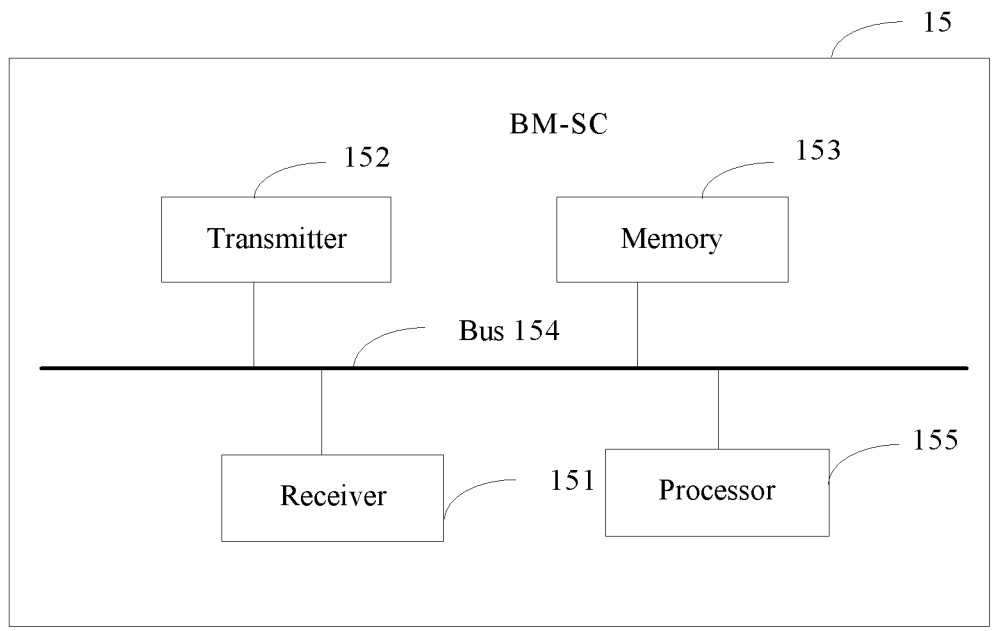
FIG. 15 is a schematic structural diagram of a BM-SC according to an embodiment of the present invention.

An embodiment of the present invention provides a BM-SC 15. As shown in FIG. 15, the BM-SC 15 includes: a receiver 151, a transmitter 152, a memory 153, a bus 154, and a processor 155. The memory 153 is configured to store an instruction and data. The receiver 151 executes the instruction and is configured to receive a first request message sent by a service capability exposure function SCEF, where the first request message is used to obtain multimedia broadcast multicast service MBMS capability information during video content distribution. The transmitter 152 executes the instruction and is configured to send a first response message to the SCEF, where the first response message includes first MBMS capability information exposed by the BM-SC, so as to distribute video content to user equipment UE after the SCEF starts an MBMS broadcast according to the first MBMS capability information.

In this embodiment of the present invention, optionally, the first request message includes an MBMS capability negotiation parameter for video distribution and that is requested by a third-party server, or the first request message includes second MBMS capability information that is to be exposed and that is determined by a home subscriber server HSS according to the MBMS capability negotiation parameter obtained from the third-party server.

The processor 155 executes the instruction and is configured to: determine, according to the MBMS capability negotiation parameter and subscription information between the BM-SC and an operator, the first MBMS capability information exposed by the BM-SC; or determine, according to the second MBMS capability information that is to be exposed and that is determined by the HSS and subscription information between the BM-SC and an operator, the first MBMS capability information exposed by the BM-SC.

In this embodiment of the present invention, optionally, the first request message further includes port information of the third-party server and media encoding information of the third-party server. The first response message includes port information of the BM-SC, a service portal link for transporting the video content, a charging rule, and media encoding information of the BM-SC.

The port information of the third-party server is used for trusted channel data transmission between the third-party server and the BM-SC. The port information of the BM-SC is used for trusted channel data transmission between the BM-SC and the third-party server. The media encoding information includes at least one of video encoding information, audio encoding information, text encoding information, or picture encoding information.

In this embodiment of the present invention, optionally, the MBMS capability negotiation parameter, the first MBMS capability information, and the second MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

This embodiment of the present invention provides a BM-SC. The BM-SC receives a first request message sent by the SCEF, where the first request message is used to obtain multimedia broadcast multicast service MBMS capability information during video content distribution. The BM-SC sends a first response message to the SCEF, where the first response message includes the MBMS capability information exposed by the BM-SC, so that after starting an MBMS broadcast according to the MBMS capability information, the SCEF distributes video content to the user equipment UE. In this way, when multiple UEs access the video content, the third-party server providing the video content may interact with an SCEF of a 3GPP and the BM-SC, and negotiates with the BM-SC to determine a to-be-exposed MBMS capability according to the MBMS capability negotiation parameter, so that the third-party server redirects requests of the UEs to a broadcast reception mode, to receive the video content, so as to expand the MBMS capability to OTT video supporting. In this way, an OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

Figure 16:
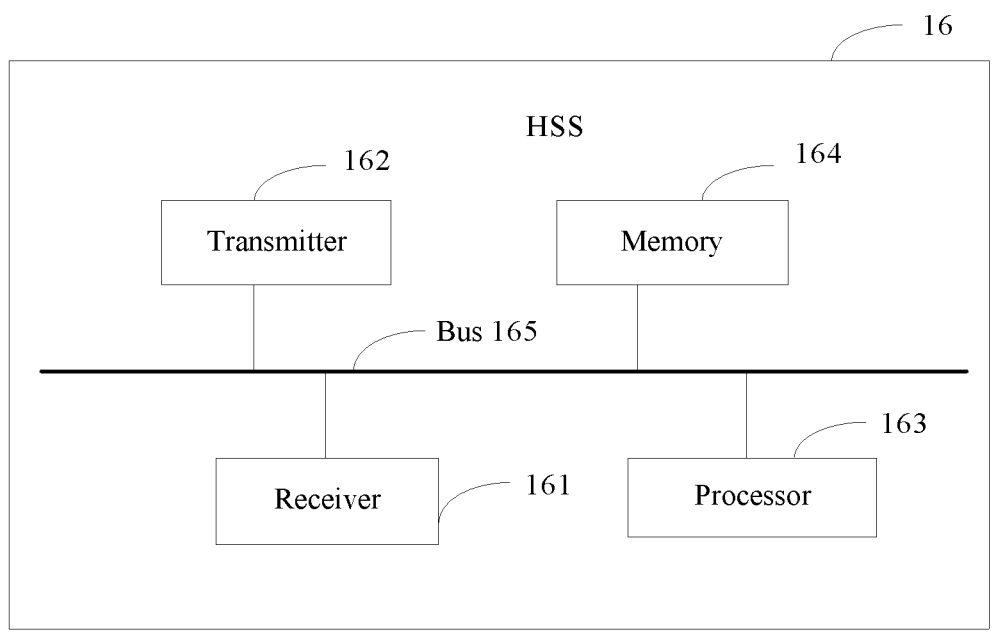
FIG. 16 is a schematic structural diagram of an HSS according to an embodiment of the present invention.

An embodiment of the present invention provides an HSS 16. As shown in FIG. 16, the HSS 16 includes a receiver 161, a transmitter 162, a processor 163, a memory 164, and a bus 165. The memory 164 is configured to store an instruction and data. The receiver 161 executes the instruction and is configured to receive a first request message sent by a service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability. The transmitter 162 executes the instruction and is configured to determine, according to subscription information between the HSS 16 and an operator, and the MBMS capability negotiation parameter and/or the MBMS media capability exposure request, whether to allow the exposure of the MBMS capability.

In this embodiment of the present invention, optionally, if the first request message includes the MBMS capability negotiation parameter, when the processor 163 is configured to determine to allow the exposure of the MBMS capability, the processor 163 is further configured to determine exposed MBMS capability information according to the subscription information and the MBMS capability negotiation parameter. The transmitter is further configured to send a first response message to the SCEF, where the first response message includes the MBMS capability information.

If the first request message includes the MBMS media capability exposure request indication, and the HSS determines to allow the exposure of the MBMS capability, the first response message includes an MBMS capability exposure request indication, to notify the SCEF that the exposure of the MBMS capability is allowed.

In this embodiment of the present invention, optionally, the MBMS capability negotiation parameter and the MBMS capability information separately include at least one of a transport mode indication of the video content, a security feature indication for using the MBMS, a content transcoding capability support indication, a content caching indication, a quality of experience QoE reporting indication, a network information reporting indication, an advertisement purchasing information indication, or an advertisement insertion capability indication, where the transport mode indication is a broadcast mode, or a broadcast/unicast hybrid mode, or a dynamic broadcast/unicast mode; the security feature indication is an enabled state or a disabled state; the content transcoding capability support indication is an indication showing that transcoding is supported or an indication showing that transcoding is not supported; the content caching indication is an indication showing that content caching is supported or an indication showing that content caching is not supported; the QoE reporting indication is an indication showing that QoE is to be reported or an indication showing that QoE is not to be reported; the network information reporting indication is an indication showing that network information is to be reported or an indication showing that network information is not to be reported, the network information includes at least one of a UE identifier, a serving cell identifier, or a network congestion state; the advertisement purchasing information indication is an indication showing that an event of purchasing advertisement content by a user is to be reported or an indication showing that an event of purchasing advertisement content by a user is not to be reported; and the advertisement insertion capability indication is an indication showing that insertion of an advertisement is supported or an indication showing that insertion of an advertisement is not supported.

This embodiment of the present invention provides an HSS. The HSS receives a first request message sent by the service capability exposure function SCEF, where the first request message includes a multimedia broadcast multicast service MBMS capability negotiation parameter for video distribution and that is sent by a third-party server AS by using the SCEF, and/or an MBMS media capability exposure request indication sent by the SCEF, where the MBMS media capability exposure request indication is used to request the HSS to expose an MBMS pipe capability. The HSS determines, according to subscription information between the HSS and an operator, and the MBMS capability negotiation parameter and/or the MBMS media capability exposure request, whether to allow the exposure of the MBMS capability. In this way, when multiple UEs access the video content, an OTT third party may interact with an SCEF of a 3GPP and the HSS, and obtain, from the HSS, an indication for allowing the exposure of the capability, so that the third-party server negotiates with the BM-SC to determine a to-be-exposed MBMS capability according to the MBMS capability negotiation parameter, so that the third-party server redirects requests of the UEs to a broadcast reception mode, to receive the video content, so as to expand the MBMS capability to OTT video supporting. In this way, the OTT third party does not need to perform negotiation and testing with different operators or different terminals, and technical difficulty of the OTT in providing a video service is reduced. Therefore, problems of heavy workload and complex management when an operator exposes an MBMS media capability to an OTT third party, and problems of heavy IOT workload and heavy video distribution and management load when the OTT third party distributes videos by using a mobile network can be resolved.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the devices and systems in the embodiments of the present invention may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:
1. A video distribution method, comprising:
receiving, by a service capability exposure function (SCEF), a first request message sent by a third-party server, wherein the first request message comprises a multimedia broadcast multicast service (MBMS) capability negotiation parameter for video distribution, the MBMS capability negotiation parameter being requested by the third-party server;
sending, by the SCEF, a second request message to a home subscriber server (HSS) according to the first request message, to request the HSS to expose an MBMS capability;
sending, by the SCEF, a third request message to a broadcast multicast service center (BM-SC) after the SCEF receives a second response message returned by the HSS when the HSS determines to allow the exposure of the MBMS capability, to request first MBMS capability information exposed by the BM-SC; and
sending, by the SCEF, the first MBMS capability information obtained from the BM-SC to the third-party server, to enable the-third party server to request, according to the first MBMS capability information, to start an MBMS broadcast, and distributes video content to user equipment (UE); and, wherein the first request message further comprises port information of the third-party server and media encoding information of the third-party server;

the second request message comprises the MBMS capability negotiation parameter and/or an MBMS media capability exposure request indication, and the MBMS media capability exposure request indication is used to request the HSS to expose an MBMS pipe capability;

if the second request message comprises the MBMS capability negotiation parameter, the second response message comprises second MBMS capability information that is to be exposed and that is determined by the HSS according to subscription information between the HSS and an operator and the MBMS capability negotiation parameter;

if the second request message comprises the MBMS media capability exposure request indication, the second response message comprises an MBMS capability exposure request indication, and the MBMS capability exposure request indication is used to request the first MBMS capability information exposed and determined by the BM-SC;

the third request message comprises the port information of the third-party server and the media encoding information of the third-party server; and if the second response message comprises the second MBMS capability information, the third request message further comprises the second MBMS capability information; and if the second response message does not comprise the second MBMS capability information, the third request message further comprises the MBMS capability negotiation parameter.

2. The method according to claim 1, wherein before the sending, by the SCEF, the first MBMS capability information obtained from the BM-SC to the third-party server, the method further comprises:

receiving, by the SCEF, a third response message sent by the BM-SC, wherein the third response message comprises the first MBMS capability information, a service portal link for transporting the video content, port information of the BM-SC, a charging rule, and media encoding information of the BM-SC.

3. The method according to claim 2, wherein the MBMS capability negotiation parameter, the first MBMS capability information, and the second MBMS capability information separately comprise at least one of a transport mode indication of the video content, a security feature indication for using the MBMS, a content transcoding capability support indication, a content caching indication, a quality of experience (QoE) reporting indication, a network information reporting indication, an advertisement purchasing information indication, or an advertisement insertion capability indication, wherein the transport mode indication is a broadcast mode, or a broadcast/unicast hybrid mode, or a dynamic broadcast/unicast mode;

the security feature indication is an enabled state or a disabled state;

the content transcoding capability support indication is an indication showing that transcoding is supported or an indication showing that transcoding is not supported;

the content caching indication is an indication showing that content caching is supported or an indication showing that content caching is not supported;

the QoE reporting indication is an indication showing that QoE is to be reported or an indication showing that QoE is not to be reported;

the network information reporting indication is an indication showing that network information is to be reported or an indication showing that network information is not to be reported, the network information comprising at least one of a UE identifier, a serving cell identifier, or a network congestion state;

the advertisement purchasing information indication is an indication showing that an event of purchasing advertisement content by a user is to be reported or an indication showing that an event of purchasing advertisement content by a user is not to be reported;

the advertisement insertion capability indication is an indication showing that insertion of an advertisement is supported or an indication showing that insertion of an advertisement is not supported;

the port information of the third-party server is used for trusted channel data transmission between the third-party server and the BM-SC;

the port information of the BM-SC is used for trusted channel data transmission between the BM-SC and the third-party server; and the media encoding information comprises at least one of video encoding information, audio encoding information, text encoding information, or picture encoding information.

4. A system configured to implement service capability exposure function (SCEF), the system comprising:

a receiver, configured to receive a first request message sent by a third-party server, wherein the first request message comprises a multimedia broadcast multicast service (MBMS) capability negotiation parameter for video distribution, the MBMS capability negotiation parameter being requested by the third-party server; and a transmitter, configured to send a second request message to a home subscriber server (HSS) according to the first request message, to request the HSS to expose an MBMS capability, wherein the transmitter is further configured to send a third request message to a broadcast multicast service center (BM-SC) when the receiver receives a second response message returned by the HSS when the HSS determines to allow the exposure of the MBMS capability, to request first MBMS capability information exposed by the BM-SC; and the transmitter is further configured to send the first MBMS capability information obtained from the BM-SC to the third-party server, to enable the-third party server to request, according to the first MBMS capability information, to start an MBMS broadcast, and distributes video content to user equipment UE; and, wherein the first request message further comprises port information of the third-party server and media encoding information of the third-party server;

the second request message comprises the MBMS capability negotiation parameter and/or an MBMS media capability exposure request indication, and the MBMS media capability exposure request indication is used to request the HSS to expose an MBMS pipe capability;

if the second request message comprises the MBMS capability negotiation parameter, the second response message comprises second MBMS capability information that is to be exposed and that is determined by the HSS according to subscription information between the HSS and an operator and the MBMS capability negotiation parameter;

if the second request message comprises the MBMS media capability exposure request indication, the second response message comprises an MBMS capability exposure request indication, and the MBMS capability exposure request indication is used to request the first MBMS capability information exposed and determined by the BM-SC;

the third request message comprises the port information of the third-party server and the media encoding information of the third-party server; and if the second response message comprises the second MBMS capability information, the third request message further comprises the second MBMS capability information; and if the second response message does not comprise the second MBMS capability information, the third request message further comprises the MBMS capability negotiation parameter.

5. The SCEF according to claim 4, wherein the receiver is further configured to receive a third response message sent by the BM-SC, wherein the third response message comprises the first MBMS capability information, a service portal link for transporting the video content, port information of the BM-SC, a charging rule, and media encoding information of the BM-SC.

6. The SCEF according to claim 5, wherein the MBMS capability negotiation parameter, the first MBMS capability information, and the second MBMS capability information separately comprise at least one of a transport mode indication of the video content, a security feature indication for using the MBMS, a content transcoding capability support indication, a content caching indication, a quality of experience (QoE) reporting indication, a network information reporting indication, an advertisement purchasing information indication, or an advertisement insertion capability indication, wherein the transport mode indication is a broadcast mode, or a broadcast/unicast hybrid mode, or a dynamic broadcast/unicast mode;

the security feature indication is an enabled state or a disabled state; the content transcoding capability support indication is an indication showing that transcoding is supported or an indication showing that transcoding is not supported;

the content caching indication is an indication showing that content caching is supported or an indication showing that content caching is not supported;

the QoE reporting indication is an indication showing that QoE is to be reported or an indication showing that QoE is not to be reported;

the network information reporting indication is an indication showing that network information is to be reported or an indication showing that network information is not to be reported, the network information comprising at least one of a UE identifier, a serving cell identifier, or a network congestion state;

the advertisement purchasing information indication is an indication showing that an event of purchasing advertisement content by a user is to be reported or an indication showing that an event of purchasing advertisement content by a user is not to be reported;

the advertisement insertion capability indication is an indication showing that insertion of an advertisement is supported or an indication showing that insertion of an advertisement is not supported; and the port information of the third-party server is used for trusted channel data transmission between the third-party server and the BM-SC; the port information of the BM-SC is used for trusted channel data transmission between the BM-SC and the third-party server; and the media encoding information comprises at least one of video encoding information, audio encoding information, text encoding information, or picture encoding information.

* * * * *